US006456932B2

(12) United States Patent
Yagyu

(10) Patent No.: US 6,456,932 B2
(45) Date of Patent: Sep. 24, 2002

(54) ROUTE SELECTING METHOD, ROUTE SELECTING SYSTEM, AND RECORDING MEDIUM

(75) Inventor: Takeshi Yagyu, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 3 days.

(21) Appl. No.: 09/739,966

(22) Filed: Dec. 20, 2000

(30) Foreign Application Priority Data

Dec. 21, 1999 (JP) .......................................... 11-362694

(51) Int. Cl.$^7$ ............................................. G08G 1/123
(52) U.S. Cl. ....................... 701/209; 701/200; 701/201; 701/210; 340/998
(58) Field of Search ................................ 701/200, 201, 701/205, 207, 208, 209, 210, 213; 340/995, 990, 998

(56) References Cited

U.S. PATENT DOCUMENTS 5,774,073 A * 6/1998 Maekawa et al. ........... 340/995

FOREIGN PATENT DOCUMENTS

| JP | 59-105113 | 6/1984 |
| JP | 8-201088 | 8/1996 |
| JP | 11-64030 | 3/1999 |

OTHER PUBLICATIONS

"Data Structure and Algorithm", A.V. Eiho et al., Baifukan Co., Ltd., 1990, (179–183).

* cited by examiner

Primary Examiner—Yonel Beaulieu
Assistant Examiner—Arthur D. Donnelly
(74) Attorney, Agent, or Firm—Wenderoth, Lind & Ponack, L.L.P.

(57) ABSTRACT

A route selecting method, a route selecting system, and a recording medium select a route in which a road on which a user has traveled is suitably reflected. A section traveling route generation portion receives a traveling track of a vehicle detected by a current position and traveling track detection portion and an optimum route searched for by an optimum route searching portion, and compares the traveling track and the optimum route, to extract different road sections as section traveling routes. A section traveling route storage portion stores the extracted section traveling route and its attribute information. A crossing section examination portion first examines, in the case of guiding, whether or not the section traveling route taken as a section a part, between two arbitrary points, of the optimum route searched for by the optimum route searching portion exists in the section traveling route storage portion, and extracts the section traveling route from the section traveling route storage portion when the section traveling route does exist. A guiding route generation portion replaces the part, between the two points, of the optimum route with the section traveling route on the basis of the optimum route and the extracted section traveling route to generate a guiding route.

33 Claims, 12 Drawing Sheets

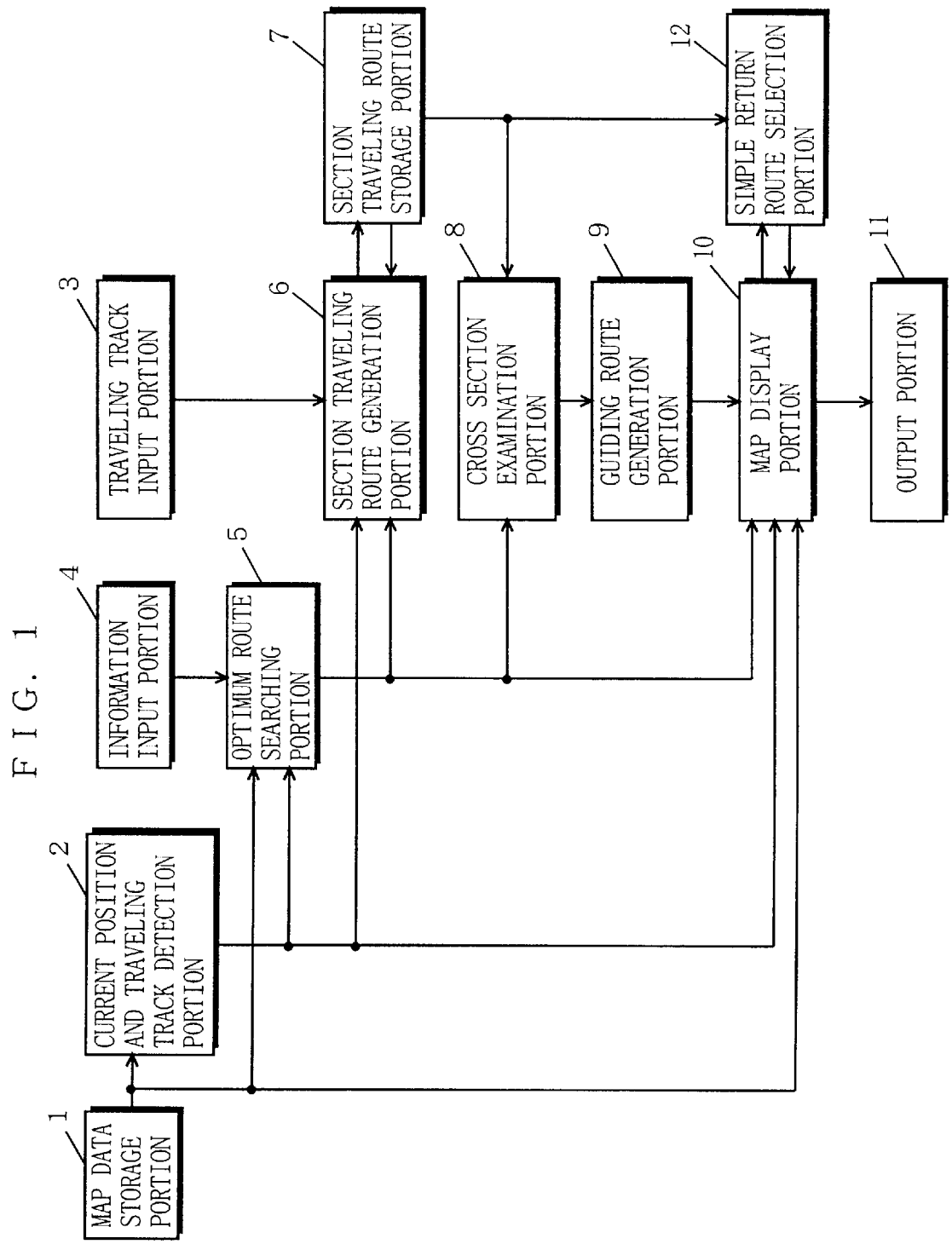

[CASE WHERE VEHICLE TRAVELS ON DIFFERENT ROUTE]

[CASE NEAR DEPARTURE POINT]

[CASE NEAR DESTINATION POINT]

[SECTION TRAVELING ROUTE DATA]

| NUMBER | TRAVELING ROUTE | TRAVEL-TIMES | DAY OF WEEK | TIME ZONE |
|---|---|---|---|---|
| ⋮ | ⋮ | ⋮ | ⋮ | ⋮ |
| N | L53, L22, L62, L33 | 1 | FRIDAY | 7-9 0' CLOCK |
| ⋮ | ⋮ | ⋮ | ⋮ | ⋮ |
| M | L82, L83, L84, ⋯ | 2 | SUNDAY | 10-12 0' CLOCK |
| ⋮ | ⋮ | ⋮ | ⋮ | ⋮ |

[ROUTE OBTAINED BY REPLACING CROSSING SECTION WITH SECTION TRAVELING ROUTE E]

[CROSS AT START POINT AND END POINT OF SECTION TRAVELING ROUTE]

[CROSS AT HALFWAY ON SECTION TRAVELING ROUTE]

[SECTION TRAVELING ROUTE G IS CLOSER TO DEPARTURE POINT THAN OPTIMUM ROUTE]

[SECTION TRAVELING ROUTE h IS CLOSER TO DESTINATION POINT THAN OPTIMUM ROUTE]

[NOT NEAR DEPARTURE POINT AND DESTINATION POINT]

TRAVEL ACCORDING TO GUIDING

DEVIATE FROM ROUTE

EXAMINE SECTION TRAVELING ROUTE FROM CURRENT POSITION TO GUIDING ROUTE

GENERATE NEW GUIDING ROUTE

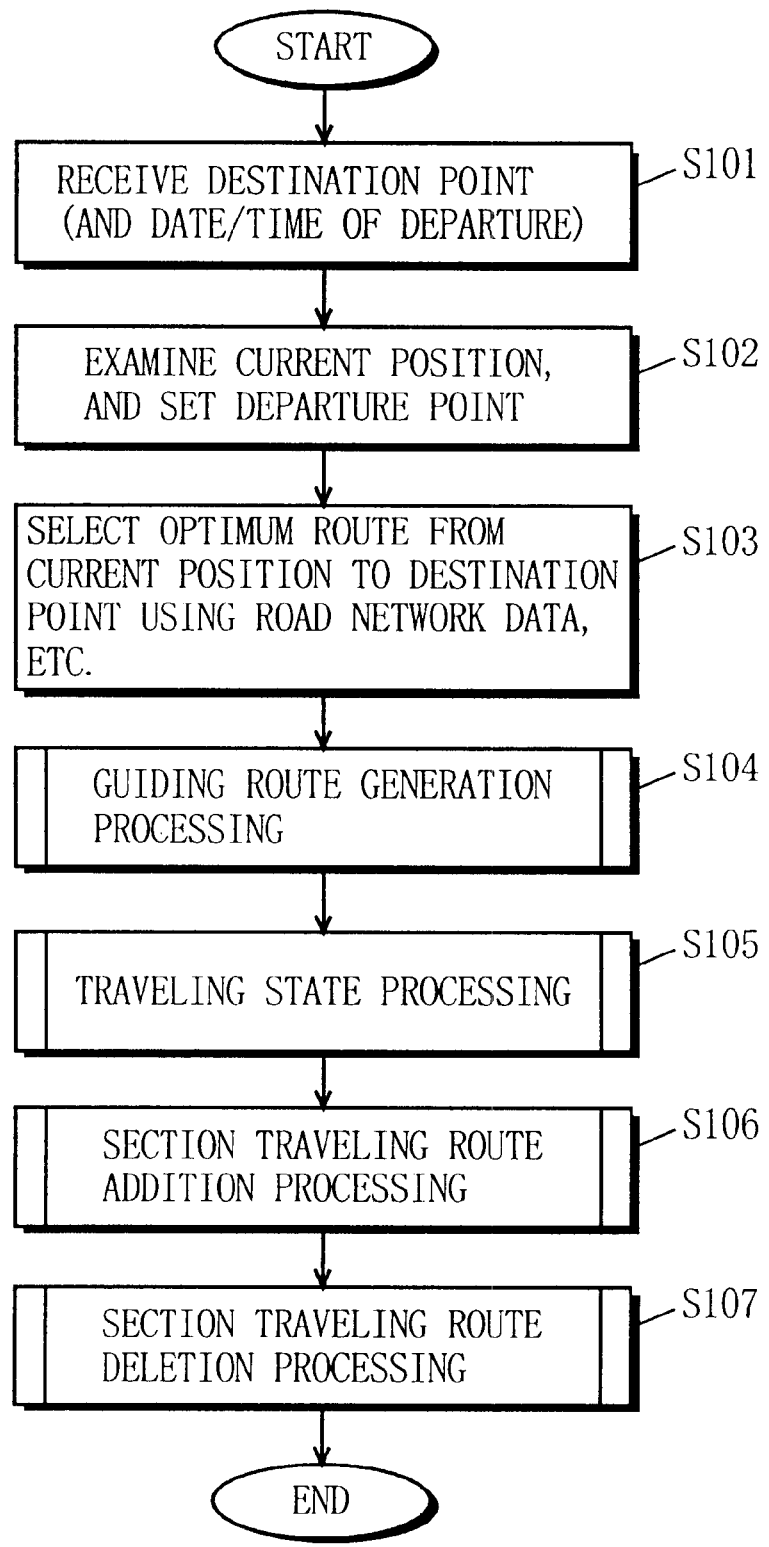

ROUTE SELECTING METHOD, ROUTE SELECTING SYSTEM, AND RECORDING MEDIUM

BACKGROUND OF THE INVENTION

1. Field of the Invention

The present invention relates generally to a route selecting method, a route selecting system, and a recording medium, and more particularly, to a method used for a car navigation system for automatically selecting an optimum route between a departure point and a destination point which are designated on a map, a system using the method, and a medium having a program for carrying out the method recorded thereon.

2. Description of the Background Art

In recent years, navigation systems for guiding vehicles have rapidly started to spread as electronic techniques have been developed. The navigation systems include one comprising a route selecting system for automatically selecting an optimum route from a departure point to a destination point (for example, a shortest distance arrival route or a minimum time arrival route) in order to improve the driving convenience of a user. The conventional route selecting system will be simply described.

In the conventional route selecting system, an example of a method of finding an optimum route for guiding a vehicle is a method disclosed in Japanese Patent Laid-Open Publication No. 59-105113 (1984-105113) entitled "Method of Automatically Guiding Vehicle" (hereinafter referred to as a first conventional method). The first conventional method is for finding an optimum route between a departure point and a destination point from data representing a network of roads by using a Dijkstra method, or the like, which is one of optimum route determining methods. The theory of the Dijkstra method is described in "Data Structure and Algorithm" (BAIFUKAN CO., LTD, issued in 1990, pp. 179 to pp. 183) written by A. V. Eiho et al. and translated by Ono, for example.

In contrast with the above-mentioned first conventional method, an example of a method of finding an optimum route to which travel experience of a user is added is a method disclosed in Japanese Patent Laid-Open Publication No 8-20108(996-201088) entitled "On-vehicle Navigation Device having Route Searching Function" (hereinafter referred to as a second conventional method). In the second conventional method, an evaluation value of a road on which a user travels is changed depending on the frequency of travel and is stored. A road having a small evaluation value is selected in preference when a route is searched for the next time.

Another example of a method of finding an optimum route to which another opinion of a user is added is a method disclosed in Japanese Patent Laid-Open Publication No. 11-64030 (1999-64030) entitled "Navigation Device" (hereinafter referred to as a third conventional method). In the third conventional method, a correction made by a user is reflected on an optimum route found by searching based on a departure point to a destination point is stored, and the route reflecting the correction is presented as a shortest route when the route from the same departure point to the same destination point is searched for again.

In a case where the evaluation value of the road on which the user travels is changed, as in the conventional second method, when a route different from the route at the time of changing the evaluation value (a route which differs in a departure point and/or a destination point) is searched for, a route forcedly using a road having an experience of travel (having a small evaluation value) may, in some cases, be selected.

In a case where the route reflecting the user correction is stored, as in the third conventional method, even for route searching that may utilize such user-corrected route, if a departure point and/or a destination point differs from that of the user-corrected route, a route which does not reflect the user-correction may be selected.

SUMMARY OF THE INVENTION

Therefore, an object of the present invention is to provide a route selecting method capable of selecting a route in which a road on which a user has traveled is suitably reflected, a system using the method, and a recording medium having a program for executing the method recorded thereon.

The present invention has the following features to solve the problem above.

A first aspect of the present invention is directed to a route selecting method for selecting an optimum route on a map in the travel of a vehicle. The route selecting method comprises searching for an optimum route between two points using map data required to select a route, collecting traveling tracks on which the vehicle travels, comparing the optimum route searched for and the traveling tracks collected, to store only different route parts on the traveling tracks as section traveling routes, when a user is guided, comparing the optimum route searched for and all the section traveling routes stored, to examine whether the section traveling route crossing the optimum route (hereinafter referred to as a crossing section traveling route) exists, replacing, with respect to the crossing section traveling route examined, a section on the optimum route which crosses the crossing section traveling route with a corresponding part of the crossing section traveling route, to generate a guiding route, and guiding the user using the guiding route generated.

As described above, in the first aspect, the section traveling route is stored only in the section in which the vehicle travels upon deviating from the optimum route is stored, and the user is guided, when the optimum route capable of using the section is searched for the next time, on a route obtained by replacing the route in the section with the stored section traveling route. Consequently, a route in which a road on which the user once traveled is suitably reflected is found depending on current circumstances, thereby making it possible to guide the user.

Preferably, the guiding step comprises displaying, when the guiding route is displayed, the optimum route together with the guiding route in such a manner that they can be distinguished.

Both the guiding route including the route on which the user once traveled and the optimum route in calculation are thus displayed, thereby making it possible for the user to refer to not only the guiding route, but also the optimum route.

Preferably, the storing step comprises deleting, with respect to the section traveling route already stored (hereinafter referred to as existing section traveling route), the existing section traveling route when the vehicle newly travels on a different route in the same section (from the same start point to the same end point) as and different from the existing section traveling route.

Accordingly, when the vehicle travels on a new route different from the existing section traveling route (the section traveling route on which the vehicle once traveled), data representing the existing section traveling route is deleted, thereby making it possible for the route on which the vehicle once traveled, but has not recently traveled, not to be reflected in the guiding route.

Preferably, the storing step comprises accumulatively storing the number of times the vehicle travels on the section traveling route together with the section traveling route, and the generating step comprises using, for the replacement, only the crossing section traveling route on which the vehicle travels not less than a particular number of times.

The number of times the vehicle travels on the section traveling route and the section traveling route are thus recorded together, and the section traveling route is reflected in the guiding route only when the vehicle travels the section traveling route not less than a particular number of times, thereby making it possible to prevent the route or the like at which the vehicle accidentally uses from being reflected in the guiding route.

Preferably, the storing step comprises reducing, with respect to the existing section traveling route, the number of times the vehicle travels on the existing section traveling route when the vehicle newly travels on a different route in the same section as the existing section traveling route.

Accordingly, when the vehicle thus travels on a new route different from the existing section traveling route, the number of times the vehicle travels on the existing section traveling route is reduced, thereby making it possible to preferentially reflect the section traveling route which is high in the frequency of utilization in the guiding route.

Preferably, the route selecting method further comprises examining whether the section traveling route including a current position of the vehicle and having a point crossing the guiding route in the travel direction is stored on the basis of the traveling tracks collected and the guiding route generated, and generating, when the section traveling route exists, a new guiding route from the current position to a destination point using the section traveling route and the guiding route. The guiding step comprises guiding the user using the new guiding route generated when it is determined that the current position of the vehicle deviates from the guiding route.

Accordingly, when the current position thus deviates from the guiding route, the route to the destination point is newly generated on the basis of the route on which the vehicle has once traveled, thereby making it possible to guide a return route using the route on which the user has experience traveling. Accordingly, it is possible to enhance a user peace of mind.

Preferably, the storing step comprises storing circumstances where the vehicle travels on the section traveling route together with the section traveling route, and the generating step comprises using, for the replacement, only the crossing section traveling route whose circumstances stored at the storing step conform to the current circumstances.

The circumstances where the vehicle travels on the section traveling route and the section of the section traveling route are thus stored together, and only the section traveling route conforming to the current circumstances is reflected in the guiding route, thereby making it possible to select the optimum route depending on the circumstances.

Preferably, the route selecting method comprises inputting a route (a traveling track) on a map on which a user desires to travel, the storing step comprising finding the section traveling route using the traveling track inputted at the inputting step in place of the traveling tracks collected at the collecting step.

Accordingly, the route (the traveling track) desired by the user is inputted, and the section traveling route in the section different from the optimum route is stored using the route, thereby making it possible to reflect the route conforming to the desire of the user in the guiding route even if the user does not actually travel.

Preferably, the storing step comprises individually storing the section traveling route for each user, and the examining step and the generating step each comprise performing processing using only the section traveling route corresponding to the user. Consequently, it is possible to guide via an optimum route corresponding to an actual driver.

Preferably, the storing step comprises determining the section traveling route to be stored in accordance with judgment given from the user. Consequently, it is possible to guide via a more optimum route in which the intention of a driver is reflected.

A second aspect of the present invention is directed to a route selecting system for selecting an optimum route on a map in the travel of a vehicle. The route selecting system comprises a map data storage portion for storing map data required to select a route, a current position and traveling track detection portion for finding a current position and a traveling track of the vehicle, an information input portion for inputting particular information (a destination point and a departure point of a route, a current time zone and day of the week, an expected time zone and day of the week of departure/arrival, and the like) in accordance with an instruction issued by a user, an optimum route searching portion for searching for an optimum route between two points using the map data and the particular information, a section traveling route generation portion for comparing the optimum route searched for by the optimum route searching portion and the traveling track found in the current position and traveling track detection portion, to extract only different route parts on the traveling track as section traveling routes, and a section traveling route storage portion for storing the section traveling routes. The route selecting system further comprises a crossing section examination portion for, when the user is guided, comparing the optimum route searched for by the optimum route searching portion and all of the section traveling routes stored in the section traveling route storage portion, to examine whether the crossing section traveling route exists, a guiding route generation portion for replacing, with respect to the crossing section traveling route examined by the crossing section examination portion, a section on the optimum route which crosses the crossing section traveling route with a corresponding part of the crossing section traveling route, to generate a guiding route, and a map display output portion for guiding the user using the guiding route generated by the guiding route generation portion.

As described above, in the second aspect, the section traveling route is stored only in the section in which the vehicle travels upon deviating from the optimum route, and the user is guided, when the optimum route capable of using the section is searched for the next time, on a route obtained by replacing the route in the section with the stored section traveling route. Consequently, a route in which a road on which the user once traveled is suitably reflected is found depending on current circumstances, thereby making it possible to guide the user.

Preferably, the map display output portion displays, when the guiding route is displayed, the optimum route together with the guiding route in such a manner that they can be distinguished.

Accordingly, both the guiding route including the route on which the user once traveled and the optimum route in calculation are displayed, thereby making it possible for the user to refer to not only the guiding route, but also the optimum route.

Preferably, the section traveling route generation portion deletes, with respect to the existing section traveling route, the existing section traveling route when the vehicle newly travels on a different route in the same section as the existing section traveling route.

Accordingly, when the vehicle thus travels on a new route different from the existing section traveling route (the section traveling route on which the vehicle once traveled), data representing the existing section traveling route is deleted, thereby making it possible for the route on which the vehicle once traveled, but has not recently traveled, not to be reflected in the guiding route.

Preferably, the section traveling route storage portion accumulatively stores the number of times the vehicle travels on the section traveling route together with the section traveling route, and the guiding route generation portion uses, for the replacement, only the crossing section traveling route on which the vehicle travels not less than a predetermined number of times.

The number of times the vehicle travels on the section traveling route and the section traveling route are thus recorded together, and the section traveling route is reflected in the guiding route only when the vehicle travels the section traveling route not less than a particular number of times, thereby making it possible to prevent the route or the like at which the vehicle accidentally uses from being reflected in the guiding route.

Preferably, the section traveling route generation portion reduces, with respect to the existing section traveling route, the number of times the vehicle travels on the existing section traveling route when the vehicle newly travels on a different route in the same section as the existing section traveling route.

When the vehicle thus travels on a new route different from the existing section traveling route, the number of times the vehicle travels on the existing section traveling route is reduced, thereby making it possible to preferentially reflect the section traveling route which is high in the frequency of utilization in the guiding route.

Preferably, the route selecting system further comprises a return route selection portion receiving the current position found by the current position and traveling track detection portion and the guiding route generated by the guiding route generation portion, to examine whether the section traveling route including the current position and having a point crossing the guiding route in the travel direction exists in the section traveling route storage portion, and generating, when the section traveling route exists, a new guiding route from the current position to a destination point using the section traveling route and the guiding route. The map display output portion guides the user using the new guiding route generated by the return route selection portion when it is determined that the current position of the vehicle deviates from the guiding route.

When the current position thus deviates from the guiding route, the route to the destination point is newly generated on the basis of the route on which the vehicle once traveled, thereby making it possible to guide via a return route using the route on which the user has experience traveling. Accordingly, it is possible to enhance a user's peace of mind.

Preferably, the section traveling route storage portion stores circumstances where the vehicle travels on the section traveling route together with the section traveling route, and the guiding route generation portion uses, for the replacement, only the crossing section traveling route whose circumstances stored in the section traveling route storage portion conform to the current circumstances.

The circumstances where the vehicle travels on the section traveling route and the section traveling route are thus stored together, and only the section traveling route conforming to the current circumstances is reflected in the guiding route, thereby making it possible to select the optimum route depending on the circumstances.

Preferably, the route selecting system further comprises a traveling track input portion for inputting a route (a traveling track) on a map on which a user desires to travel, the section traveling route generation portion using the traveling track inputted to the traveling track input portion in place of the traveling tracks found by the current position and traveling track detection portion, to extract the section traveling route.

Accordingly, the route (the traveling track) desired by the user is inputted, and the section traveling route in the section different from the optimum route is stored using the route, thereby making it possible to reflect the route conforming to the desire of the user in the guiding route even if the vehicle does not actually travel.

Preferably, the section traveling route storage portion individually stores the section traveling route for each user, and the crossing section examination portion and the guiding route generation portion each perform processing using only the section traveling route corresponding to the user. Consequently, it is possible to guide via an optimum route corresponding to an actual driver.

More preferably, the section traveling route storage portion determines the stored section traveling route in accordance with judgment given from the user. Consequently, it is possible to guide via a more optimum route in which the intention of the driver is reflected.

Typically, in a computer comprising a storage device (a ROM, a RAM, a hard disk, etc.) storing predetermined program data which can be executed and a CPU (Central Processing Unit) for executing the program data, the route selecting method described in the first aspect is realized. In this case, predetermined program data capable of executing each of the steps described in the first aspect may be introduced into the computer through a writable recording medium (a CD-ROM, a floppy disk, etc.).

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of a route selecting system according to an embodiment of the present invention;

FIG. 8 is a flow chart showing an example of route selecting operations performed by a route selecting system according to an embodiment of the present invention;

DESCRIPTION OF THE PREFERRED EMBODIMENT

Figure 2A:
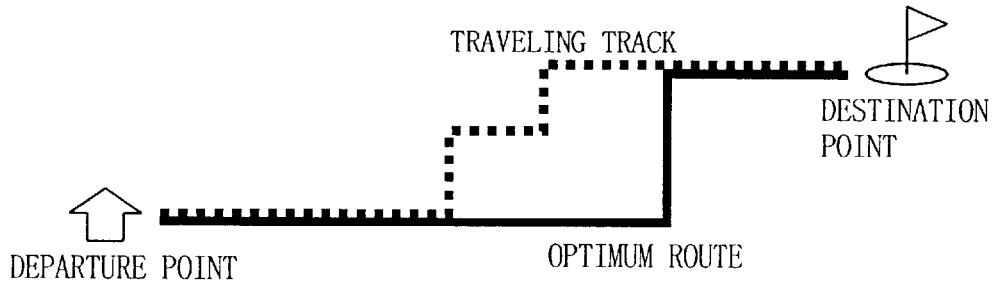
FIGS. 2a to 2e are diagrams showing an example of operations performed by a section traveling route generation portion 6 shown in FIG. 1.

FIG. 1 is a block diagram showing the configuration of a route selecting system according to an embodiment of the present invention. In FIG. 1, the route selecting system according to the present embodiment comprises a map data storage portion 1, a current position and traveling track detection portion 2, a traveling track input portion 3, an information input portion 4, an optimum route searching portion 5, a section traveling route generation portion 6, a section traveling route storage portion 7, a crossing section examination portion, 8, a guiding route generation portion 9, a map display portion 10, an output portion 11, and a simple return route selection portion 12.

Operations performed by the respective portions in the route selecting system according to the embodiment of the present invention will be described.

The map data storage portion 1 stores data for map display used for displaying a map presented to a user and road network data used for detecting a current position of a vehicle and selecting an optimum route from a departure point to a destination point. Typically, the map data storage portion 1 has each of the data stored in a recording medium such as a CD-ROM, and reads out the necessary data from the recording medium by an incorporated driving mechanism (not shown).

The current position and traveling track detection portion 2 first finds an approximate current position and an approximate traveling track of the vehicle using the speed of the vehicle or an angle at which the vehicle turns and a radio wave from a satellite (a radio wave from a GPS (Global Positioning System)). The current position and traveling track detection portion 2 then refers to the road network data stored in the map data storage portion 1, to accurately find the current position and the traveling track of the vehicle.

The traveling track input portion 3 is operated in response to an input operation of the user, generates a traveling track in accordance with an instruction issued by the user, and outputs the generated traveling track to the section traveling route generation portion 6. The traveling track input portion 3 is a constituent used when the user is not actually driving the vehicle to generate a traveling track (i.e., a virtual traveling track).

The information input portion 4 is operated in response to an input operation of the user, and outputs to the optimum route searching portion 5 information relating to a destination point for route searching (a departure point, a current time zone and day of the week, an expected time zone and day of the week of departure/arrival, etc., if required) in accordance with an instruction issued by the user.

The optimum route searching portion 5 uses the road network data stored in the map data storage portion 1, to search for and select an optimum route from a departure point to a destination point. The departure point is set using information relating to the current position of the vehicle which is detected by the current position and traveling track detection portion 2 or the departure point received from the information input portion 4. Further, information relating to the destination point received from the information input portion 4 is used for setting the destination point. Further, the optimum route searching portion 5 receives information (attribute information) relating to the current time zone and day of the week or the time zone and day of the week in and on which the user intends to depart (or arrive) from the information input portion 4, as required.

The section traveling route generation portion 6 receives the traveling track of the vehicle from the current position and traveling track detection portion 2 or the traveling track input portion 3, and receives the selected optimum route from the optimum route searching portion 5. The section traveling route generation portion 6 compares the optimum route and the traveling track to extract, as a section traveling route, a road section different from the optimum route on the traveling track (a road section having two points, i.e., a start point and an end point on the optimum route). The section traveling route thus extracted is outputted to the section traveling route storage portion 7 from the section traveling route generation portion 6. The section traveling route generation portion 6 specifies every section traveling route having its two points on the traveling track out of the section traveling routes already stored in the section traveling route storage portion 7, and increases the number of times of traveling for the section traveling route which is the same as the traveling track while decreasing the number of times of traveling for the section traveling route which is different from the traveling track. The section traveling route generation portion 6 outputs the number of times of traveling (attribute information), which is increased or decreased, to the section traveling route storage portion 7.

The section traveling route storage portion 7 stores, as section traveling route data, the section traveling route and the number of times of traveling which are received from the section traveling route generation portion 6. At this time, the section traveling route storage portion 7 stores together the attribute information such as the time zone and day of the week in and on which the vehicle travels.

The crossing section examination portion 8 receives the optimum route from the optimum route searching portion 5. The crossing section examination portion 8 examines whether or not the section traveling route having as a section a part, between two arbitrary points (conforming to the travel direction), of the optimum route exists in the section traveling route storage portion 7. When such section traveling route exists, the crossing section examination portion 8 acquires the section traveling route from the section traveling route storage portion 7, and outputs the section traveling route, together with the optimum route, to the guiding route generation portion 9. The section traveling route having as a section a part, between two arbitrary points, of the optimum route may not only be a road having a start point and an end point on the optimum route, but also a road crossing the optimum route on its way.

The guiding route generation portion 9 replaces the part between the two points of the optimum route with the section traveling route on the basis of the optimum route and the section traveling route (the whole or a part) which are received from the crossing section examination portion 8, to generate a guiding route. The guiding route generation portion 9 outputs the generated guiding route to the map display portion 10.

The map display portion 10 refers to the map display data stored in the map data storage portion 1, to generate image data for displaying a map including the current position of the vehicle found by the current position and traveling track detection portion 2 and its vicinity or a map in a range desired by the user. The map display portion 10 generates together, when the guiding route generated by the guiding route generation portion 9 (or a new guiding route generated by the simple return route selection portion 12, described later) is included in the range of the map to be displayed, image data representing the guiding route. Further, the map display portion 10 outputs guidance information for guiding the vehicle (for example, voice information and/or display information "Please turn right at an intersection 100 m ahead.") on the basis of the current position of the vehicle and the guiding route. The guidance information is not a primary object of the present invention and hence, the description thereof is omitted.

The output portion 11 comprises a display, a speaker, and so forth, and outputs image data, guidance information, and so forth fed from the map display portion 10 by a screen display and voice.

The simple return route selection portion 12 receives, when the vehicle deviates from the guiding route during guidance, the current position of the vehicle and the guiding route from the map display portion 10, and examines whether or not the section traveling route having, as a section, a section between two points, i.e., the current position of the vehicle and an arbitrary point on the guiding route, exists in the section traveling route storage portion 7. When such section traveling route exists, the simple return route selection portion 12 acquires the section traveling route from the section traveling route storage portion 7, and generates a new guiding route obtained by replacing a part, between the two points, of the guiding route with the acquired section traveling route. The simple return route selection portion 12 outputs the generated new guiding route to the map display portion 10 as a guiding route. When such section traveling route does not exist, a route returning to the optimum route based on the prior art is searched for in the simple return route selection portion 12 (or the optimum route searching portion 5).

Referring now to FIGS. 2a to 2e, operations performed by the section traveling route generation portion 6 shown in FIG. 1 will be described in detail by taking specific examples.

Figure 2B:
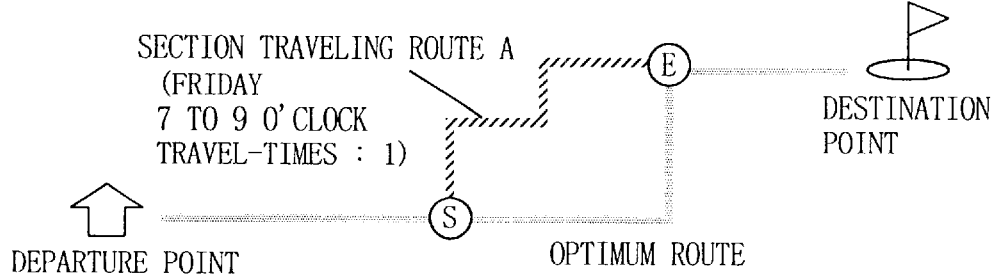

FIGS. 2a to 2e are diagrams showing examples of a generation of a section traveling route and conversion of attribute information which are performed by the section traveling route generation portion 6. FIG. 2a illustrates a traveling track of a vehicle provided by the current position and traveling track detection portion 2 (or the traveling track input portion 3) and an optimum route searched for by the optimum route searching portion 5. The section traveling route generation portion 6 compares the traveling track (indicated by a broken line) with the optimum route (indicated by a solid line) shown in FIG. 2a, to specify a different road section, and extracts a traveling track from a start point to an end point (indicated simply as and respectively in the drawings) of the different road section as shown in FIG. 2b, as a section traveling route A. Simultaneously, the section traveling route generation portion 6 specifies a time zone (seven o'lock to nine o'lock in this example) and a day of the week (Friday in this example) in and on which the vehicle travels. Further, the section traveling route generation portion 6 sets the number of times of traveling which is attribute information relating to the section traveling route A to "one" (indicated simply as "travel-times: 1" in the drawings). When the section traveling route A has already been stored in the section traveling route storage portion 7, the section traveling route generation portion 6 increases the number of times of traveling currently stored by one. The section traveling route generation portion 6 outputs the section traveling route A thus found, together with the attribute information, to the section traveling route storage portion 7.

Figure 2C:
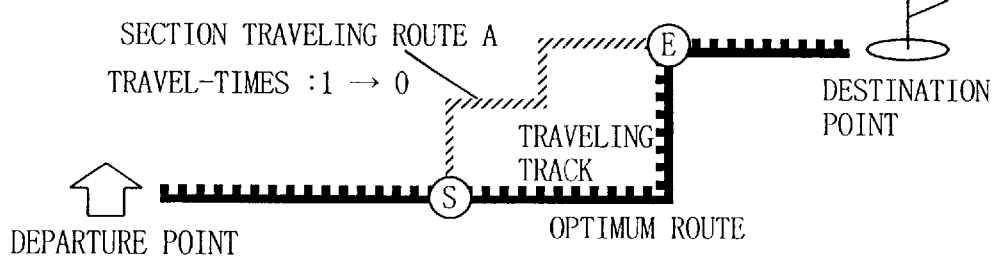

On the other hand, when the vehicle travels on the optimum route (the optimum route=the traveling track) in a case where the section traveling route A already exists in the section traveling route storage portion 7, as shown in FIG. 2c, the section traveling route generation portion 6 decreases the number of times of traveling which is the attribute information relating to the section traveling route A by one. The section traveling route on which the number of times of traveling is "zero" may be deleted from the section traveling route storage portion 7.

Figure 2D:
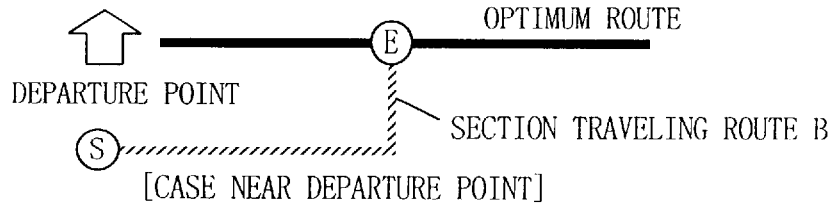
Figure 2E:
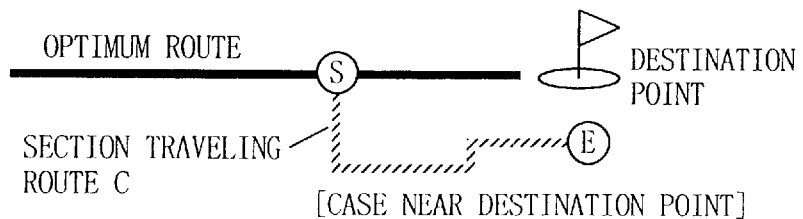

When the traveling is started from a point different from a departure point of the optimum route, as shown in FIG. 2d, the section traveling route generation portion 6 extracts, as a section traveling route B, a road section from the point at which the traveling is started to a point merged into the optimum route. When the traveling is terminated in a point different from a destination point of the optimum route, as shown in FIG. 2e, the section traveling route generation portion 6 extracts, as a section traveling route C, a road section from a point deviating from the optimum route to the point at which the traveling is terminated.

Figures 3A, 3B:
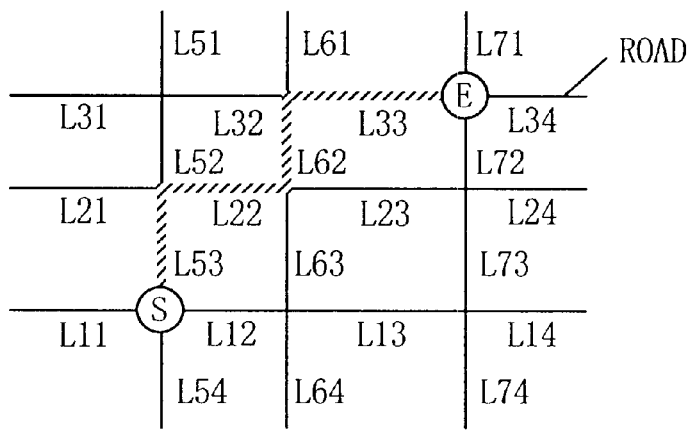
FIGS. 3a and 3b are diagrams showing an example of section traveling route data stored in a section traveling route storage portion 7 shown in FIG. 1.

Referring now to FIGS. 3a and 3b, contents stored in the section traveling route storage portion 7 shown in FIG. 1 will be described in detail by taking specific examples.

FIGS. 3a and 3b are diagrams showing examples of section traveling route data stored in the section traveling route storage portion 7. FIG. 3a is a diagram showing road network data and a certain section traveling route. The road network data is composed of intersections and roads (links) connecting the intersections. The links are respectively assigned inherent numbers. The section traveling route is indicated by a string of link numbers. The section traveling route shown in FIG. 3a is stored as a route passing through links L53, L22, L62, and L33 in this order. FIG. 3b illustrates an example of contents stored as the section traveling route data in the section traveling route storage portion 7, and the number of times of traveling, a day of the week on which the vehicle travels, and a time zone in which the vehicle travels are together stored in correspondence with the section traveling route represented by the string of link numbers.

Although the section traveling route in the section traveling route storage portion 7 is represented by the string of link numbers, it may be stored by a storing method in another data format, provided that a route is seen in the format, for example, a string of data representing intersections through which the vehicle passes (a string of node numbers). Although a distinction in a time zone, a day of the week, or the like is stored as attribute information corresponding to the section traveling route, another distinction in which traffic conditions are assumed to be changed, for example, a distinction in weekdays/holidays, in morning/afternoon/night/midnight, or in days when money is collected/other days may be stored.

Figure 4A:
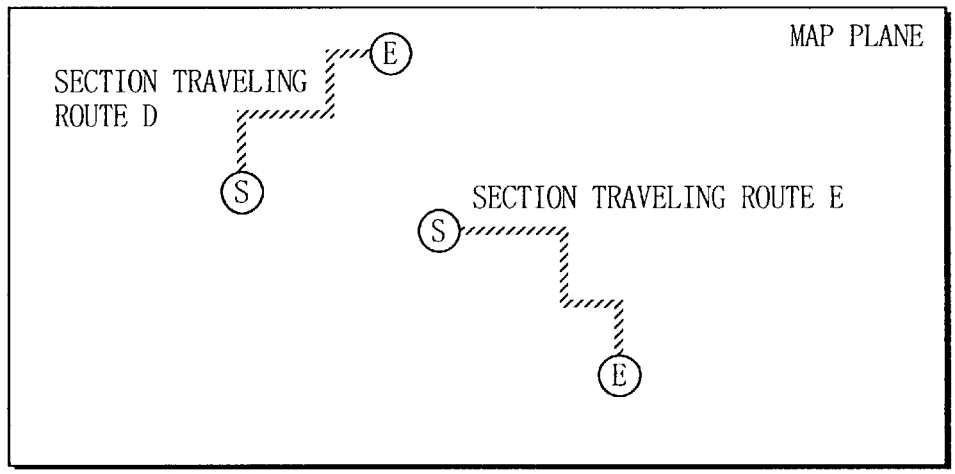
FIGS. 4a to 4c are diagrams for explaining an example of operations performed by a crossing section examination portion 8 and a guiding route generation portion 9 shown in FIG. 1.
Figure 4B:
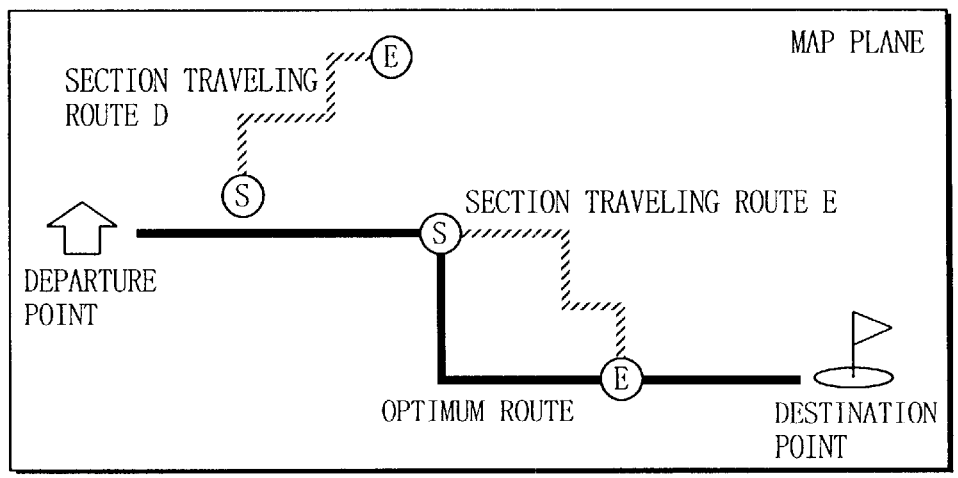
Figure 4C:
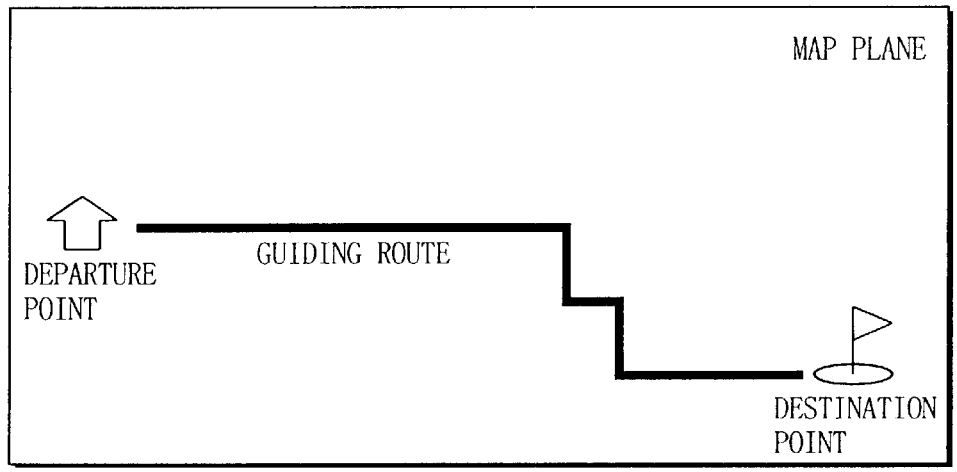

Referring now to FIGS. 4a to 4c, operations performed by the crossing section examination portion 8 and the guiding route generation portion 9 shown in FIG. 1 will be described in detail by taking specific examples.

FIGS. 4a to 4c are diagrams for explaining examples of the procedural flow of examining a section traveling route crossing an optimum route searched for in the optimum route searching portion 5, and then generating a guiding route on the basis of the results of the examination. FIG. 4a is an image view positionally showing section traveling routes D and E represented by section traveling route data stored in the section traveling route storage portion 7 on a map plane. FIG. 4b is an image view showing an optimum route from a departure point to a destination point which is found by the optimum route searching portion so as to overlap with FIG. 4a.

In such a positional relationship (FIG. 4b), the crossing section examination portion 8 first examines whether or not the section traveling route D crosses the optimum route. In this example, the section traveling route D and the optimum route do not cross each other. Accordingly, the crossing section examination portion 8 does not take the section traveling route D as a processing object. The crossing section examination portion 8 then examines whether or not the section traveling route E crosses the optimum route. In this example, a start point and an end point of the section traveling route E cross the optimum route. Accordingly, the crossing section examination portion 8 takes the section traveling route E as a processing object and extracts a route between the two points which cross the optimum route (a traveling route in a crossing section) from the section traveling route E. In this example, both the start point and the end point of the section traveling route E are positioned on the optimum route. Accordingly, the section traveling route E is extracted as it is as the traveling route in the crossing section. The traveling route in the crossing section thus extracted and the optimum route are outputted to the guiding route generation portion 9.

The guiding route generation portion 9 deletes a crossing section part of the optimum route, generates a route into which the extracted traveling route in the crossing section is inserted in place of the crossing section part, and outputs the generated route to the map display portion 10 as a guiding route.

Referring now to FIGS. 5a to 5e, examples of a pattern of an optimum route and a section traveling route in a case where section traveling route data is reflected in a guiding route in the guiding route generation portion 9 shown in FIG. 1. FIGS. 5a to 5e are diagrams for explaining patterns for generating a guiding route on the basis of the section traveling route data.

First, a case where both a start point and an end point of a section traveling route F cross an optimum route (FIG. 5a) is considered. In this case, a route from the start point to the end point of the section traveling route F is extracted as a traveling route in a crossing section. A corresponding section part of the optimum route is replaced with the extracted traveling route in the crossing section, thereby generating a guiding route.

Then, a case where there exist two points crossing the optimum route halfway on the section traveling route F (FIG. 5b) is considered. In this case, only a route between the two points crossing the optimum route on the section traveling route F is extracted as a traveling route in a crossing section. A corresponding section part of the optimum route is replaced with the extracted traveling route in the crossing section, thereby generating a guiding route.

Furthermore, a case where a section traveling route and an optimum route cross each other at only one point is considered. This case can be classified into the following three cases.

Figure 5A:
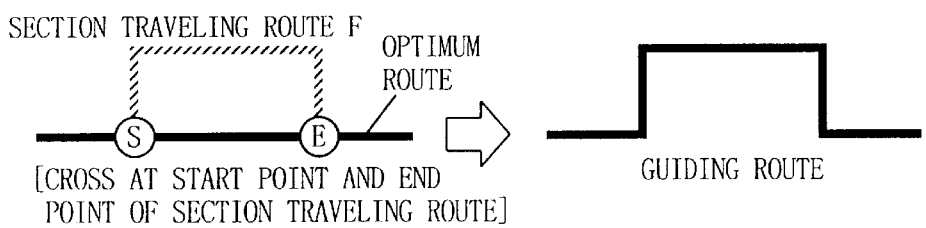
FIGS. 5a to 5e are diagrams for explaining an example of a pattern for generating a guiding route on the basis of section traveling route data in the guiding route generation portion 9 shown in FIG. 1.
Figure 5B:
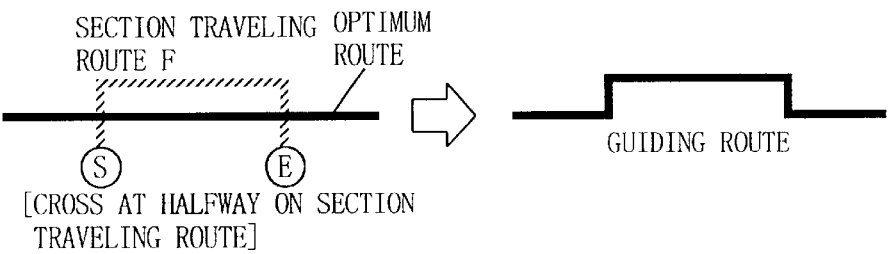
Figure 5C:
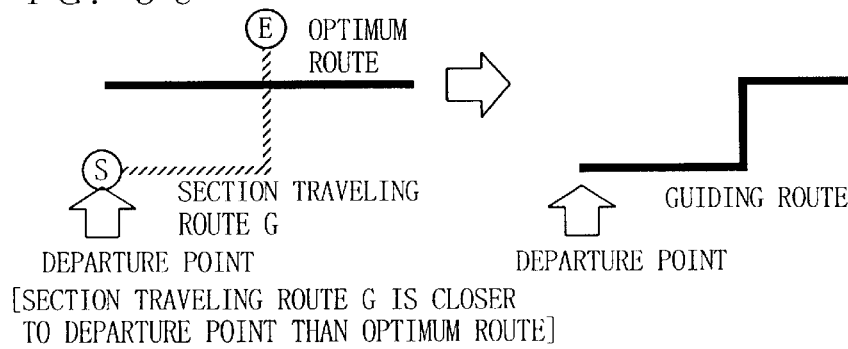
Figure 5D:
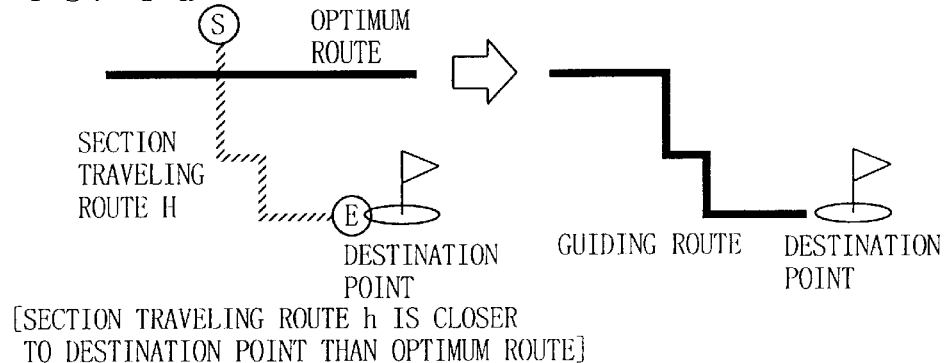

First, a case where the optimum route is started from a point spaced apart from a departure point, and a section traveling route G is closer to the departure point than the point at which the optimum route is started (FIG. 5c). In this case, a route between one point on the section traveling route G closest to the departure point (which is assumed to be a crossing point) and the other point at which the section traveling route G crosses the optimum route is extracted as a traveling route in a crossing section. A part behind the other point of the optimum route is replaced with the extracted traveling route in the crossing section, thereby generating a guiding route.

Then, a case where the optimum route is terminated at a point spaced apart from a destination point, and a section traveling route H is closer to the destination point than the point at which the optimum route is terminated (FIG. 5d) is considered. In this case, a route between one point at which the section traveling route H crosses the optimum route and the other point on the section traveling route H closest to the destination point (which is assumed to be a crossing point) is extracted as a traveling route in a crossing section. A part ahead of the one point of the optimum route is replaced with the extracted traveling route in the crossing section, thereby generating a guiding route.

Figure 5E:
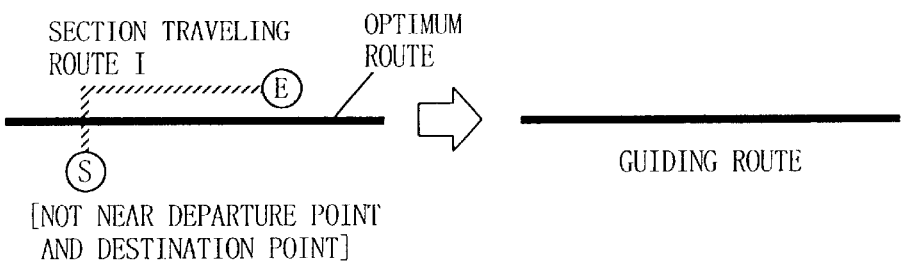

Finally, a case is considered where a section traveling route I and the optimum route cross each other at only one point in a position spaced apart from a departure point and a destination point (FIG. 5e). In this case, the section traveling route I does not cross the optimum route at two points. Accordingly, the section traveling route I is not a processing object in the generation of the guiding route.

It goes without saying that a section traveling route having no point crossing the optimum route is not a processing object in generating the guiding route.

Figure 6A:
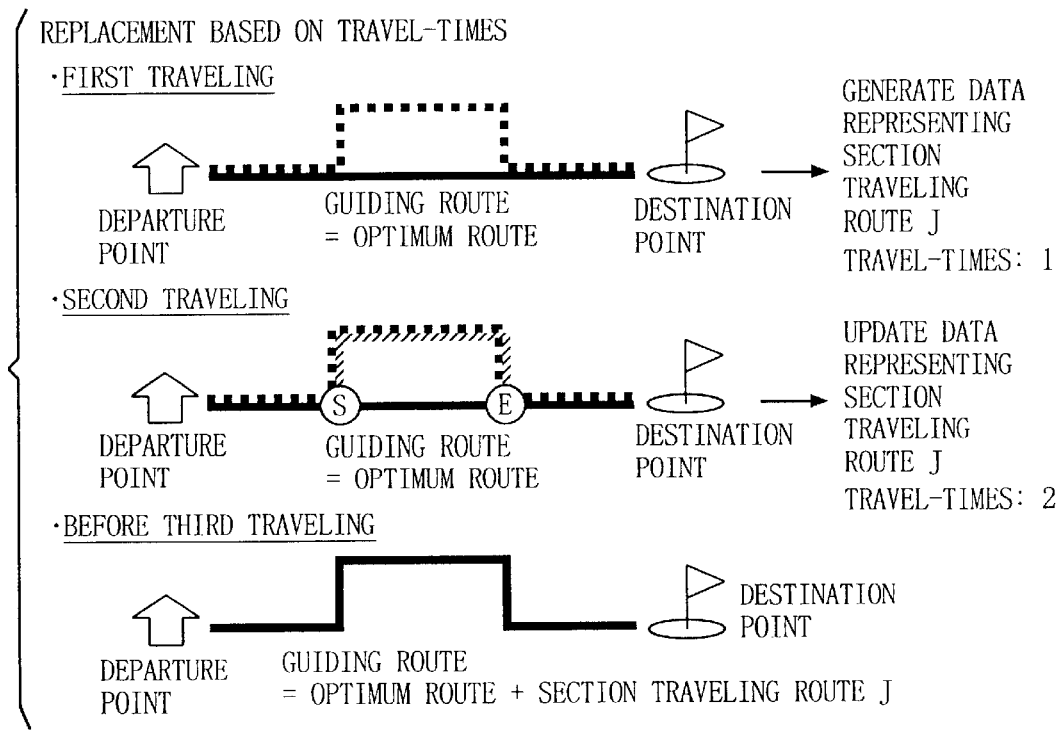
FIGS. 6a and 6b are diagrams for explaining an example of conditions at the time of using section traveling route data in the guiding route generation portion 9 shown in FIG. 1.
Figure 6B:
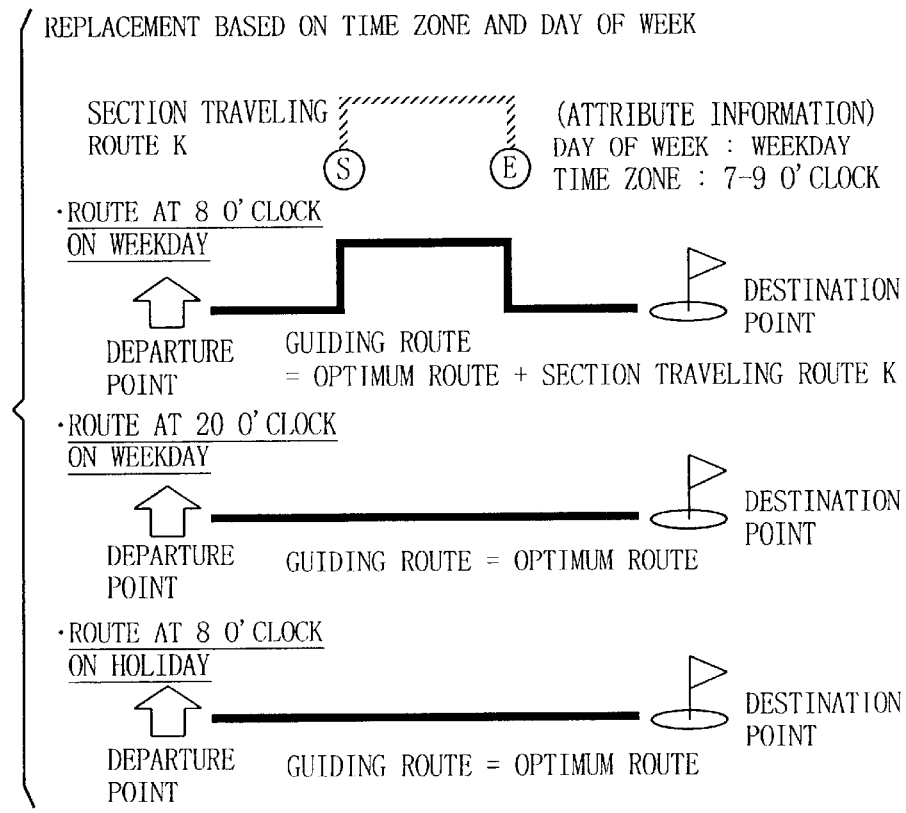

Referring now to FIGS. 6a and 6b, an example of conditions under which section traveling route data is reflected in a guiding route in the guiding route generation portion 9 shown in FIG. 1 will be described.

FIG. 6a is a diagram for explaining a case where a section traveling route J is reflected in a guiding route on the basis of conditions of the number of times of traveling. Such conditioning makes it possible to consider only a section traveling route which is utilized at a high frequency, but not a section traveling route on which the vehicle accidentally traveled (for example, a case where the vehicle is bypassed by road repairing) in generating the guiding route. As an example, conditions are set such that only a section traveling route on which the vehicle travels not less than two times is replaced with an optimum route in the guiding route generation portion 9.

Under such set conditions, in the case of a route on which a vehicle first travels, a section traveling route relating to the route is not stored in the section traveling route storage portion 7. In this case, an optimum route found by the optimum route searching portion 5 is presented to a user as a guiding route. When the vehicle travels on a road different from the guiding route (the optimum route), a new section traveling route J is generated from its traveling track and the number of times of traveling is stored as "one" in the section traveling route storage portion 7.

When the route between the same points is then searched for again, the optimum route is the same route as that searched for last time. However, there exists a section traveling route J crossing the optimum route stored last time. Therefore, the crossing section examination portion 8 extracts the section traveling route J and outputs, together with the optimum route, the section traveling route J to the guiding route generation portion 9. In this case, the number of times of traveling on the section traveling route J is still "one" Accordingly, a limitation on the above-mentioned conditions is applied. Therefore, as a guiding route for the current (second) traveling, the same route as the guiding route when the vehicle traveled for the last time (first time) is outputted. When the vehicle travels for the second time on a road having the same traveling track as the traveling track on which the vehicle traveled for the first time, the number of times of traveling on the section traveling route J, which has already been stored, is increased by one to "two".

Thereafter, when the route between the same points is further searched for again, the same optimum route as that for the first traveling and the second traveling is found. Since the number of times of traveling on the section traveling route J to be outputted to the guiding route generation portion 9 is "two" however, a route which has been replaced with the section traveling route J is set as a guiding route. Accordingly, for the third traveling, the user can be guided by the same route as the route (the traveling track) on which the vehicle actually traveled for the first time and for the second time.

FIG. 6b is a diagram for explaining a case where a section traveling route K is reflected in a guiding route on the basis of conditions by a time zone and a day of the week. Such conditioning makes it possible to consider traffic conditions which vary depending on a time factor (for example, a case where a road is congested with commuter vehicles on weekdays, while not being congested on holidays) in generating the guiding route. As an example, the time zone that is attribute information is classified in units of two hours (1 to 3 o'clock, 4 to 6 o'clock, 7 to 9 o'clock, 10 to 12 o'clock, 13 to 15 o'clock, 16 to 18 o'clock, 19 to 21 o'clock, and 22 to 24 o'clock), and the day of the week that is attribute information is classified into weekdays from Monday to Friday and holidays such as Saturday, Sunday, and public holidays. The time zone and the day of the week are stored in the section traveling route storage portion 7.

On the basis of the above-mentioned example, the section traveling route K generated when the vehicle travels at 8 o'clock on Friday is classified as "7 to 9 o'clock, weekday". When an optimum route which should use the section traveling route K is found in this state, for example, the day of the week and the time on and at which the searching is performed is 8 o'clock on Monday, the guiding route in which the section traveling route K is reflected is generated. When the searching is performed at 20 o'clock on Monday and at 8 o'clock on Saturday, however, 20 o'clock on Monday and 8 o'clock on Saturday do not coincide with the conditions in the attribute information (the time zone and the day of the week) relating to the section traveling route K. Accordingly, a guiding route in which the section traveling route K is not reflected is generated.

Although the classification based on the time zone and the day of the week was described as an example, the classification may be based on the preference of the user. For example, such conditions that the section traveling route is reflected in only days each having an "8" at its end (8-th, 18-th, and 28-th) may be set, or an input device which can be freely set by the user may be provided to determine the classification.

Referring now to FIGS. 7a to 7d, operations performed by the simple return route selection portion 12 shown in FIG. 1 will be described in detail by taking specific examples.

Figure 7A:
FIGS. 7a to 7d are diagrams showing an example of operations performed by a simple return route selection portion 12 shown in FIG. 1.
Figure 7B:
Figure 7C:
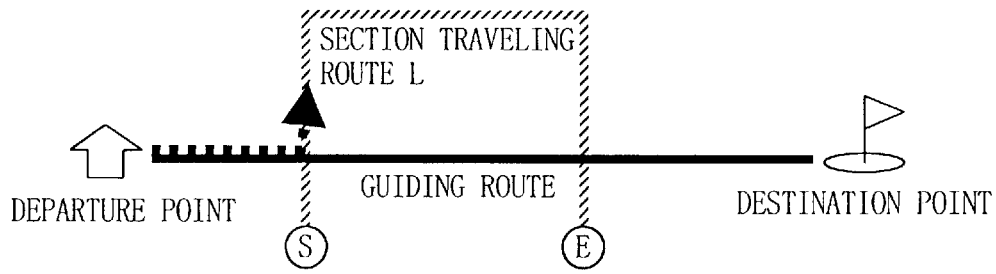
Figure 7D:
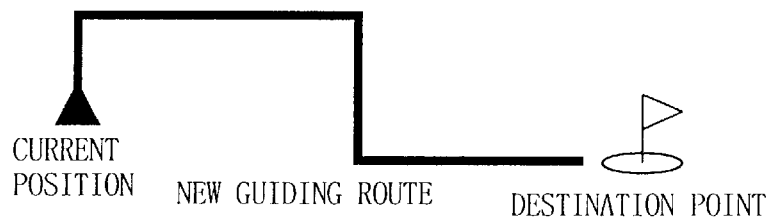

FIG. 7a illustrates a state where a vehicle travels in accordance with a guiding route generated by the guiding route generation portion 9 when a route from a departure point to a destination point is found. FIG. 7b illustrates a state where the vehicle deviates from the guiding route by the intention of a user. At this time, the map display portion 10 senses that the vehicle deviated from the guiding route, and outputs the guiding route before the deviation and the current position of the vehicle to the simple return route selection portion 12. In response, the simple return route selection portion 12 searches for, in the section traveling route storage portion 7, a section traveling route on which the current position exists and which has crossing points with the guiding route based on the current position of the vehicle and the guiding route which are fed from the map display portion 10. When a corresponding section traveling route L exists, the simple return route selection portion 12 acquires the section traveling route L from the section traveling route storage portion 7 (FIG. 7c). The simple return route selection portion 12 extracts, as a traveling route in a crossing section, a part from the current position to a point crossing the guiding route of the acquired section traveling route L, and connects the traveling route in the crossing section to the guiding route, to newly generate a guiding route from the current position to the destination point (FIG. 7d) and output the guiding route to the map display portion 10.

Referring now to FIGS. 8 to 12, description is made of route selecting operations performed by the route selecting system according to the embodiment of the present invention.

FIG. 8 is a flow chart showing an example of the route selecting operations performed by the route selecting system according to the embodiment of the present invention. FIGS. 9 to 12 are flow charts showing examples of more detailed operations at sub-routine steps S104 to S107 shown in FIG. 8. As an example, operations are shown in a case where a vehicle travels from its current position to a destination point inputted by a user. In order to make the description more general, the date and the day of the week, etc. are not specified, and only the number of times of traveling is specified with respect to attribute information relating to section traveling route data.

First referring to FIG. 8, the optimum route searching portion 5 receives the position coordinates (longitude and latitude) of the destination point from the information input portion 4 in response to an input operation performed by the user (step S101). The optimum route searching portion 5 also receives the date and time of departure, as required. The optimum route searching portion 5 then receives the coordinates (longitude and latitude) of the current position of the vehicle and the travel direction of the vehicle from the current position and traveling track detection portion 2 to set a departure point (step S102). The optimum route searching portion 5 uses road network data stored in the map data storage portion 1 (further traffic information, etc. in some cases), to search for and select an optimum route from the departure point to the destination point (step S103). The route searching processing at step S103 is performed using a minimum route searching method such as a Dijkstra method conventionally known.

The crossing section examination portion 8 and the guiding route generation portion 9 then perform guiding route generation processing in order to find a guiding route for guiding the user from the current position to the destination point (step S104). The detailed operation at step S104 is shown in FIG. 9.

Figure 9:
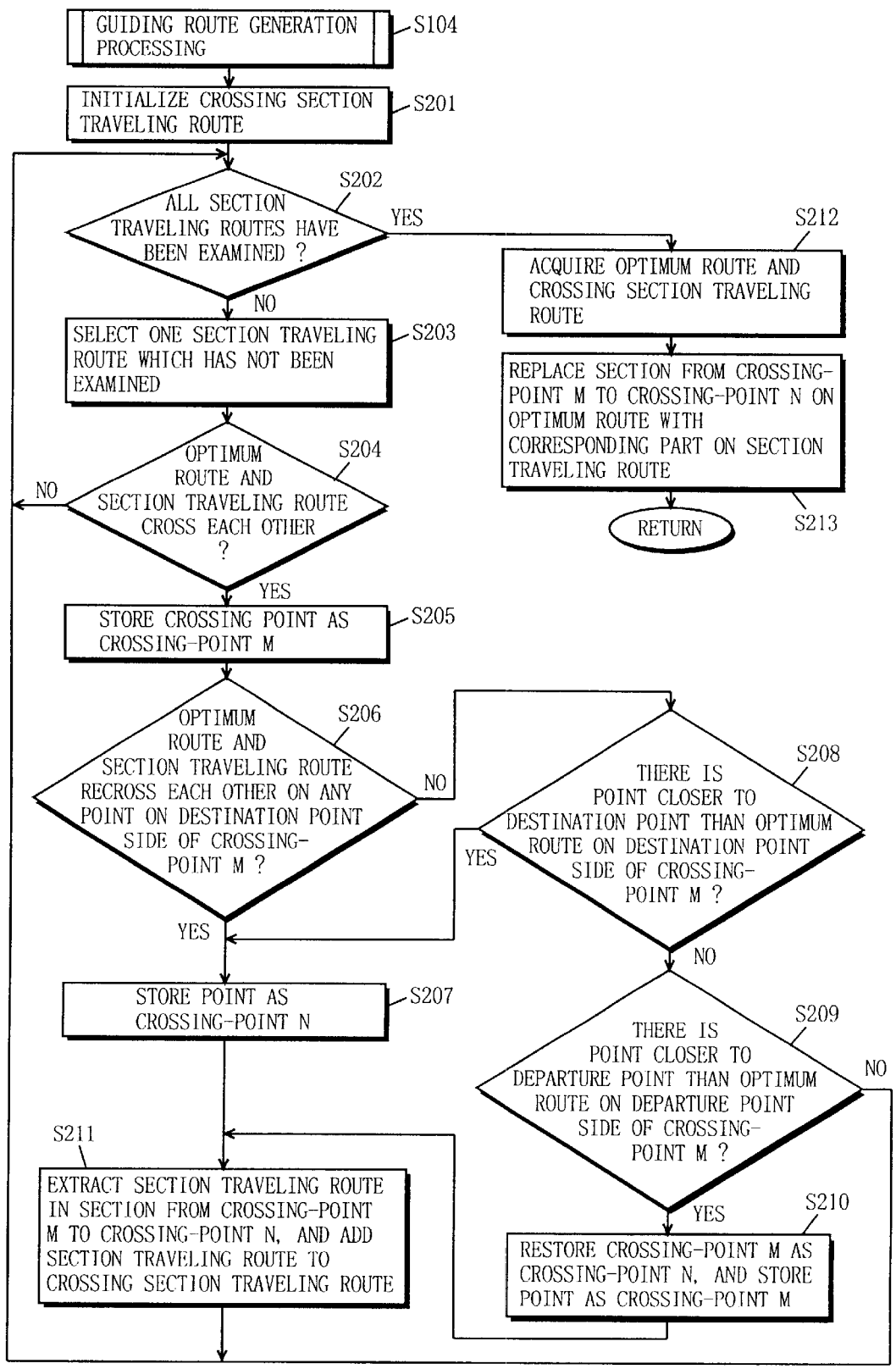
FIG. 9 is a flow chart showing an example of detailed operation at a sub-routine step S104 shown in FIG. 8.

Referring to FIG. 9, operations in the guiding route generation processing (FIG. 8, step S104) will be described.

When the guiding route generation processing is started, the crossing section examination portion 8 first initializes a region which stores a section traveling route crossing an optimum route (hereinafter referred to as a crossing section traveling route) found by examination (step S201). The crossing section examination portion 8 then determines whether or not all section traveling routes represented by section traveling route data stored in the section traveling route storage portion 7 are examined (step S202). At the current time point, i.e., immediately after the initialization at step S201, the examination has not yet been made. Accordingly, the procedure proceeds to step S203. The crossing section examination portion 8 selects, as an examination object, one of the section traveling routes which have not yet been examined from the section traveling route data (step S203).

The crossing section examination portion 8 then uses the section traveling route selected at step S203 and the optimum route found at step S103, and traces the optimum route from a departure point to a destination point, to examine whether or not there is a point crossing the selected section traveling route (step S204). When there is no crossing point as a result of the examination at step S204, the procedure is returned to step S202. At step S202, the crossing section examination portion 8 examines another section traveling route which has not yet been examined. On the other hand, when there is a crossing point as a result of the examination at step S204, the crossing section examination portion 8 stores the crossing point as a crossing-point M (step S205).

After the crossing-point M is found at step S205, the crossing section examination portion 8 traces the optimum route from the crossing-point M to the destination point, to examine whether or not there is a point recrossing the section traveling route (step S206). When there is a recrossing point as a result of the examination at step S206, the crossing section examination portion 8 stores the recrossing point as a crossing-point N (step S207). On the other hand, when there is no recrossing point as a result of the examination at step S206, the crossing section examination portion 8 further searches for a point closest to the current destination point (hereinafter referred to as a destination closest vicinity point) in the direction of a track on which the vehicle travels from the crossing-point M on the selected section traveling route, and then examines whether or not the destination closest vicinity point is closer to the destination point than a final point on the optimum route (an end point of the route) (step S208).

When the destination closest vicinity point is closer to the destination point at step S208, the crossing section examination portion 8 stores the destination closest vicinity point as the crossing-point N (step S207). On the other hand, when the destination closest vicinity point is farther from the destination point at step S208, the crossing section examination portion 8 further searches fob a point closest to the departure point (hereinafter referred to as a departure closest vicinity point) in the opposite direction to the direction of the track on which the vehicle travels from the crossing-point M on the selected section traveling route, and then examines whether or not the departure closest vicinity point is closer to the departure point than a first point on the optimum route (a start point of the route) (step S209). When the departure closest vicinity point is closer to the first point at step S209, the crossing section examination portion 8 stores the crossing-point M previously stored as a crossing-point N again, and stores the departure closest vicinity point as a new crossing-point M (step S210). On the other hand, when the departure closest vicinity point is farther than the first point at step S209, the crossing section examination portion 8 determines that the selected section traveling route is not the crossing section traveling route. Therefore, the procedure is returned to step S202. At step S202, the other section traveling route which has not yet been examined is examined.

The crossing section examination portion 8 then extracts from the section traveling route storage portion 7 a route from the found crossing-point M to the crossing-point N, and stores the route as the crossing section traveling route after performing the processing at step S207 or S210 (step S211). Even if the other crossing section traveling route has already been stored, the contents thereof are not deleted (overwritten), and the section traveling route newly extracted is additionally stored. When the crossing section traveling route has been stored, the procedure is returned to the foregoing step S202. At step S202, the crossing section examination portion 8 examines the other section traveling route which has not yet been examined.

When steps S202 to S211 are repeated until termination in the crossing section examination portion 8, the examination of all the section traveling routes represented by the section traveling route data stored in the section traveling route storage portion 7 is complete, and the guiding route generation portion 9 then acquires the optimum route found at step S103 and the stored crossing section traveling route (step S212). At this time, the optimum route found at step S103 is left as it is in the crossing section examination portion 8. The guiding route generation portion 9 then replaces a part of the optimum route that corresponds to a section between the crossing-point M and the crossing-point N with that of the crossing section traveling route (step S213).

A guiding route in which the crossing section traveling route is reflected in the optimum route is thus generated by the guiding route generation portion 9, thereby terminating the guiding route generation processing at step S104. The procedure is returned to the main routine shown in FIG. 8.

Referring to FIG. 8 again, after the guiding route generation processing (step S104) is terminated, the map display portion 10, the output portion 11, and the simple return route selection portion 12 perform traveling state processing in order to provide guiding information to the user using a guiding route (step S105). Detailed operations at step S105 are shown in FIG. 10.

Figure 10:
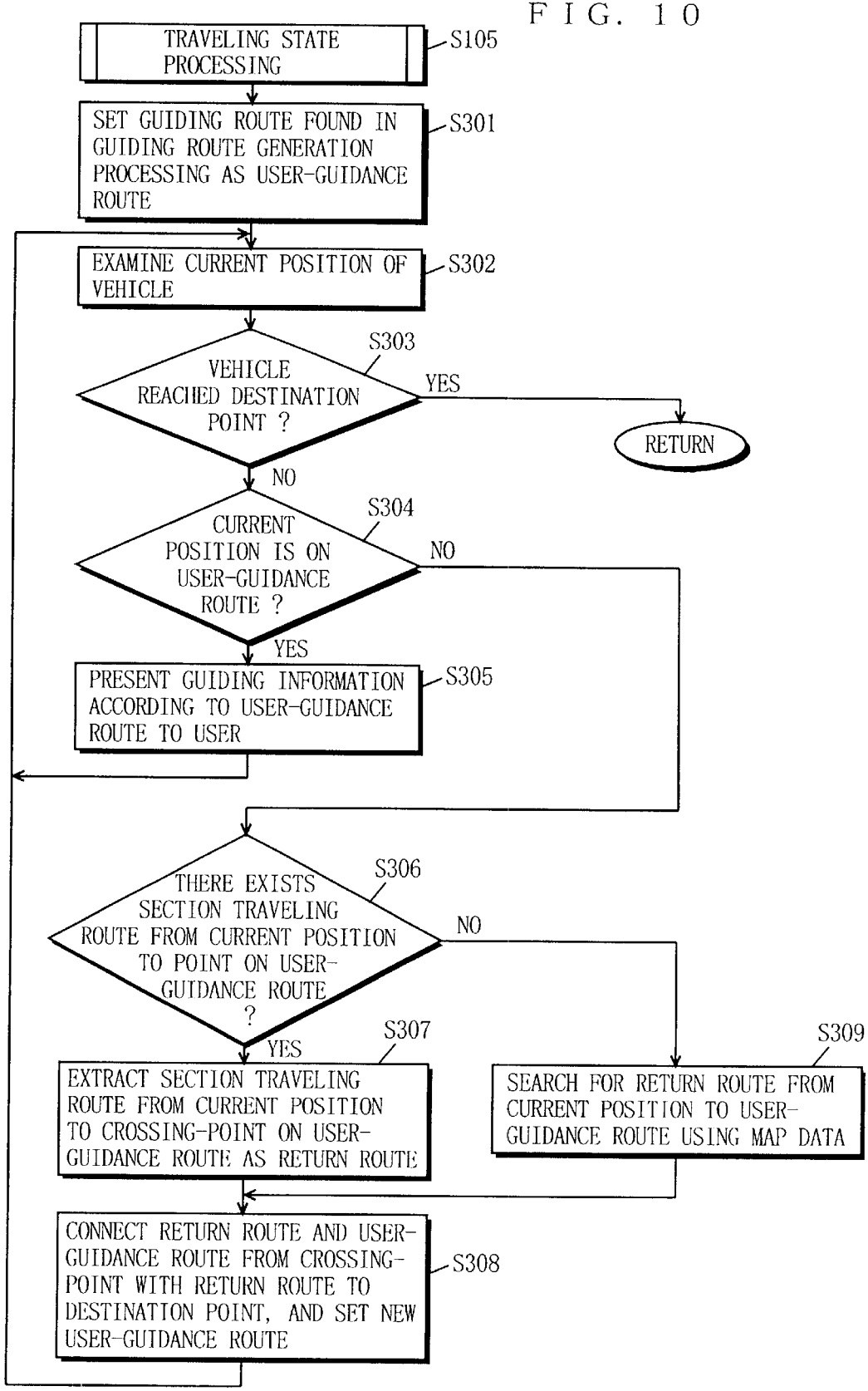
FIG. 10 is a flow chart showing an example of detailed operation at a sub-routine step S105 shown in FIG. 8.

Referring to FIG. 10, the operations in the traveling state processing (FIG. 8, step S105) will be described.

When the traveling state processing is started, the map display portion 10 sets the guiding route found at step S104 as a user-guidance route provided to the user (step S301). The map display portion 10 receives the current position of the vehicle from the current position and traveling track detection portion 2 (step S302). The map display portion 10 then compares the received current position and the user-guidance route, to examine whether or not the vehicle has reached the destination point (step S303).

If the vehicle has reached the destination point as a result of the examination at step S303, the map display portion 10 terminates the traveling state processing at step S105. The procedure is returned to the main routine shown in FIG. 8. On the other hand, if the vehicle has not reached the destination point as a result of the examination at step S303, the map display portion 10 further determines whether or not the current position of the vehicle is on the user-guidance route (step S304).

If determined at step S304 that the current position of the vehicle is on the user-guidance route, the map display portion 10 generates guiding information "Turn right at an intersection 300 m ahead", for example, conforming to the user-guidance route on the basis of the current position of the vehicle, to present the guiding information to the user using the output portion 11 (step S305). When the guiding information relating to the current position has been presented, the procedure is returned to step S302 again. At step S302, the map display portion 10 examines the subsequent current position to which the vehicle is moved.

Steps S302 to S305 are repeated until the vehicle travels on the user-guidance route to reach the destination point.

When the map display portion 10 determines at step S304 that the current position of the vehicle deviates from the user-guidance route, however, the simple return route selection portion 12 examines whether or not the section traveling route having, as a section, a part between the current position and a point on the user-guidance route exists in the section traveling route storage portion 7 (step S306). When the section traveling route exists as a result of the examination at step S306, the simple return route selection portion 12 extracts the section traveling route from the section traveling route storage portion 7 as a return route from the current position to the user-guidance route (step S307). On the other hand, when the section traveling route does not exist as a result of the examination at step S306, the simple return route selection portion 12 finds the return route from the current position to the user-guidance route by reading out data from the map data storage portion 1 and searching for the optimum route again (step S309).

The simple return route selection portion 12 generates a new user-guidance route leading from the current point to the destination point by connecting the return route found at step S307 or S309 to the user-guidance route (step S308). When the new user-guidance route has been generated, the procedure is returned to the foregoing step S302. At step S302, the subsequent position to which the vehicle is moved is examined by the map display portion 10.

Referring to FIG. 8 again, after the traveling state processing (step S105) is terminated, the section traveling route generation portion 6 performs section traveling route addition processing (step S106). Detailed operations at step S106 are shown in FIG. 11.

Figure 11:
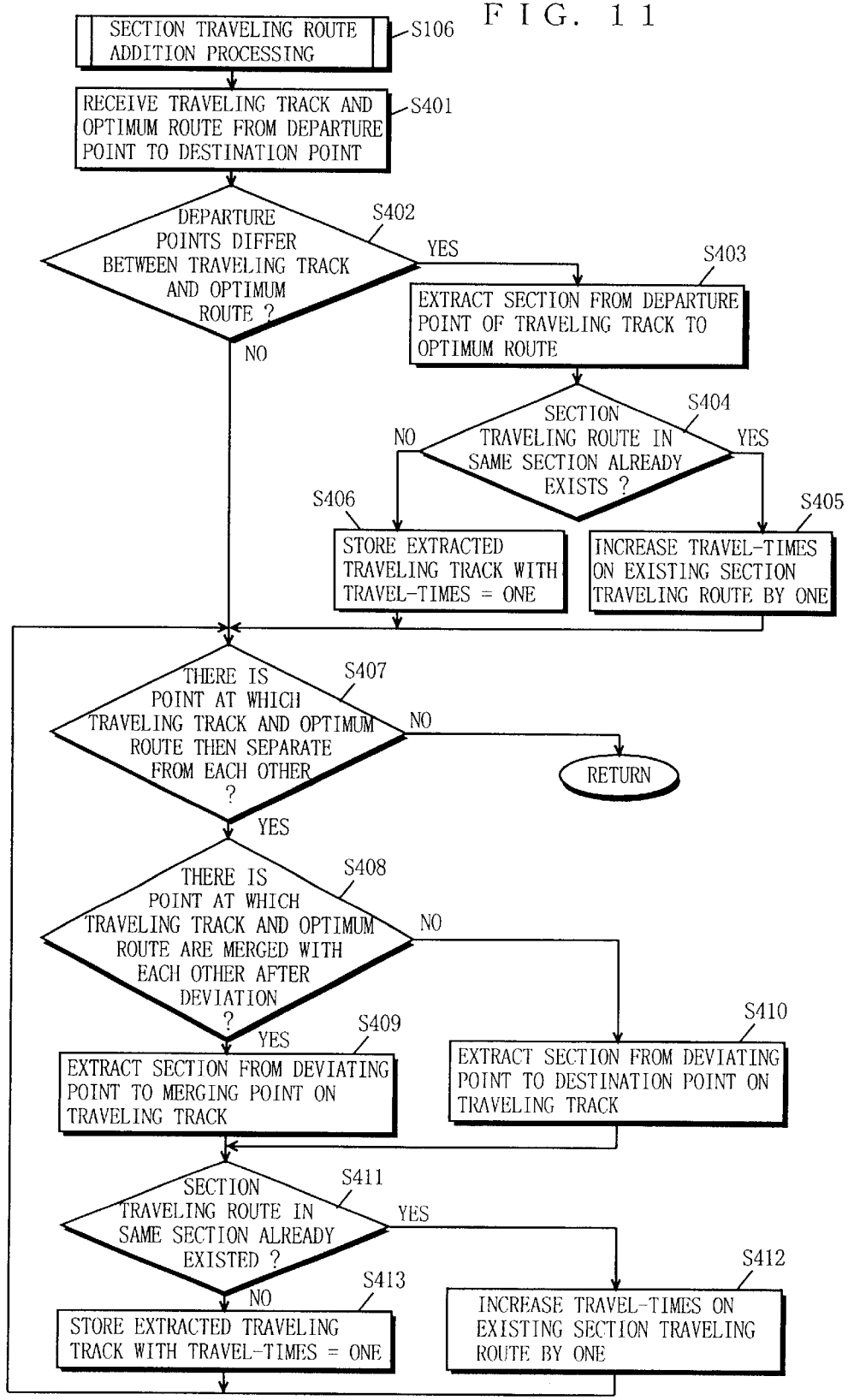
FIG. 11 is a flow chart showing an example of detailed operation at a sub-routine step S106 shown in FIG. 8.

Referring to FIG. 11, the operations in the section traveling route addition processing (FIG. 8, step S106) will be described.

When the section traveling route addition processing is started, the section traveling route generation portion 6 receives a traveling track on which the vehicle travels until it reaches the destination point from the departure point from the current position and traveling track detection portion 2 or the traveling track input portion 3, and receives the optimum route found at step S103 by the optimum route searching portion 5 (step S401). The section traveling route generation portion 6 compares the received traveling track with the optimum route, to first determine whether or not their departure points differ from each other (step S402). When it is determined at step S402 that they do not differ, the procedure directly proceeds to step S407. At step S407, the section traveling route generation portion 6 performs processing. On the other hand, when it is determined at step S402 that they differ, the section traveling route generation portion 6 extracts a traveling track in a section on which the vehicle travels from the departure point to the optimum route (step S403). The section traveling route generation portion 6 examines whether or not the extracted traveling track has already been stored as a section traveling route in the section traveling route storage portion 7 (step S404). The section traveling route generation portion 6 increases the number of times of traveling on the section traveling route by one if the extracted traveling track has already been stored at step S404 (step S405), while storing the traveling track extracted at step S403 as a new section traveling route (the number of times of traveling is one) in the section traveling route storage portion 7 (step S406) if it has not been stored. Thereafter, the procedure proceeds to step S407.

When it is determined at step S402 that the departure points do not differ, or when the processing at step S405 or S406 is terminated, the section traveling route generation portion 6 further examines a point at which the traveling track and the optimum route then separate from each other leading to the destination point (step S407).

If the traveling track and the optimum route are the same until the vehicle reaches the destination point as a result of the examination at step S407, the section traveling route generation portion 6 terminates the section traveling route addition processing at step S106. The procedure is returned to the main routine shown in FIG. 8. On the other hand, if there is a point at which the traveling track and the optimum route separate from each other (a separating point) as a result of the examination at step S407, the section traveling route generation portion 6 further examines a point at which the traveling track and the optimum route are merged (a merging point) ahead the separating point (step S408). The section traveling route generation portion 6 extracts a traveling track in a section from the separating point to the merging point if the merging point is found as a result of the examination at step S408 (step S409), while extracting a traveling track in a section from the separating point to the destination point if the merging point is not found (step S410).

The section traveling route generation portion 6 then examines whether or not the traveling track extracted at step S409 or S410 has already been stored as a section traveling route in the section traveling route storage portion 7 (step S411). The section traveling route generation portion 6 increases the number of times of traveling on the section traveling route by one (step S412) if the traveling track has already been stored as a result of the examination at step S411, while storing the extracted traveling track as a new section traveling route (the number of times of traveling is one) in the section traveling route storage portion 7 (step S413) if the traveling track has not been stored. Thereafter, the procedure is returned to step S407.

Referring now to FIG. 8 again, after the section traveling route addition processing (step S106) is terminated, the section traveling route generation portion 6 performs section traveling route deletion processing (step S107). Detailed operation at step S107 are shown in FIG. 12.

Figure 12:
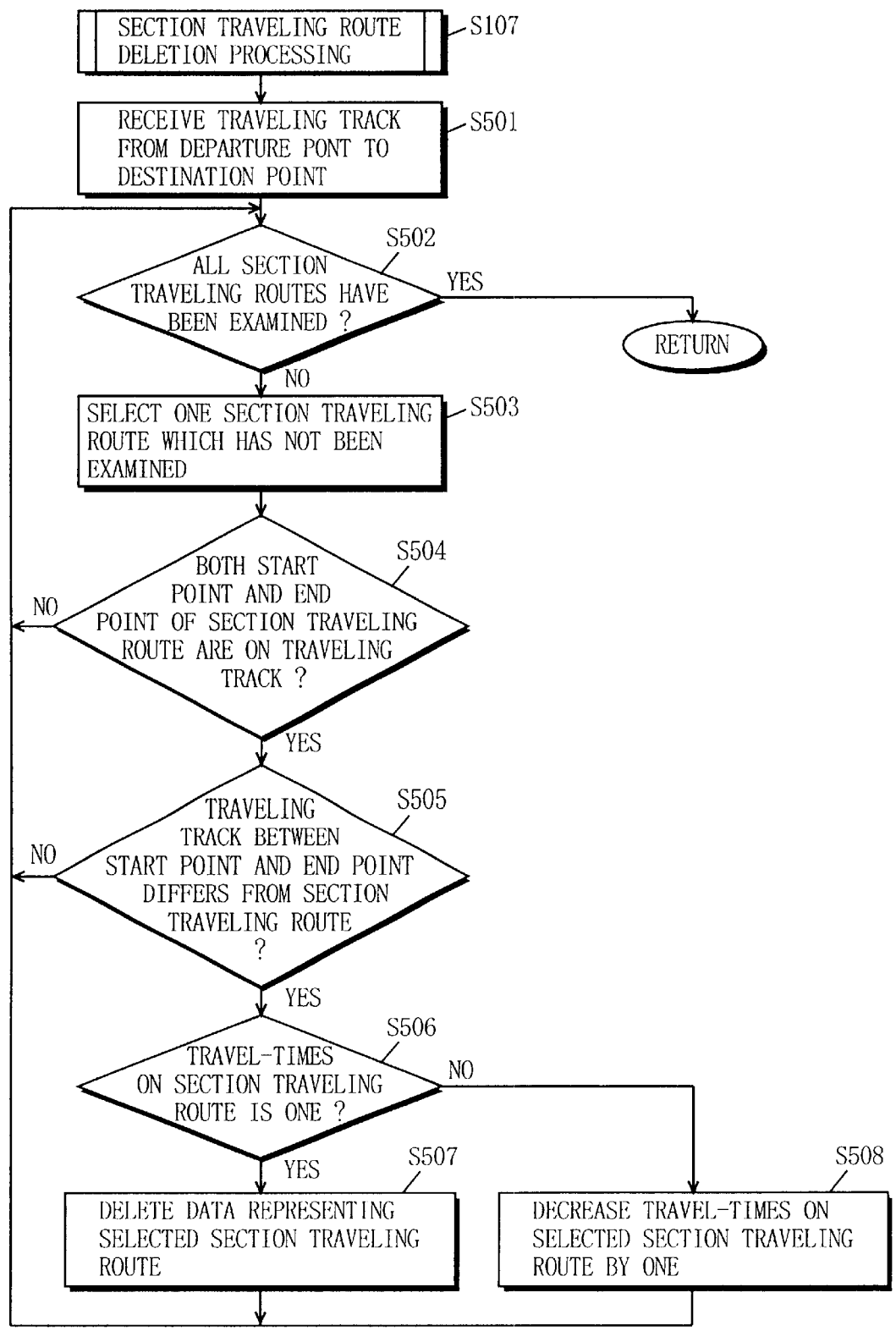
FIG. 12 is a flow chart showing an example of detailed operation at a sub-routine step S107 shown in FIG. 8.

Referring to FIG. 12, the operations in the section traveling route deletion processing (FIG. 8, step 107) will be described.

When the section traveling route deletion processing is started, the section traveling route generation portion 6 receives a traveling track on which the vehicle travels from the departure point to the destination point from the current position and traveling track detection portion 2 (or the traveling track input portion 3, as required) (step S501). The section traveling route generation portion 6 then determines whether or not all section traveling routes represented by section traveling route data stored in the section traveling route storage portion 7 have been examined (step S502). At the current time point, i.e., after step S501, the examination has not yet been made. Therefore, the procedure directly proceeds to step S503. The section traveling route generation portion 6 selects, as an examination object, one of the section traveling routes which have not been examined yet from the section traveling route data (step S503).

The section traveling route generation portion 6 then examines whether or not both a start point and an end point of the selected section traveling route exist on the traveling track received at step S501 (step S504). If the start point and the end point do not exist on the traveling track as a result of the examination at step S504, the section traveling route generation portion 6 is done with examination on the selected section traveling. Therefore, the procedure is returned to step S502. At step S502, the section traveling route generation portion 6 examines another section traveling route which has not yet been examined. On the other hand, if the start point and the end point exist on the traveling track as a result of the examination at step S504, the section traveling route generation portion 6 further examines whether or not the traveling route in the section between the start point and the end point differs from the traveling track received at step S501 (step S505).

If the traveling route and the traveling track are the same as a result of the examination at step S505, the section traveling route generation portion 6 is done with examination on the selected section traveling route. Therefore, the procedure is returned to step S502. At step S502, the section traveling route generation portion 6 examines another section traveling route which has not yet been examined. On the other hand, if they differ as a result of the examination at step S505, the section traveling route generation portion 6 examines whether or not the number of times of traveling on the selected section traveling route is one (step S506). If the number of times of traveling is one as a result of the examination at step S506, data representing the selected section traveling route is deleted from the section traveling route storage portion 7. If the number of times of traveling is more than one, the number of times of traveling is decreased by one and is stored in the section traveling route storage portion 7. After the selected section traveling route has thus been examined, the procedure is returned to step S502. At step S502, the section traveling route generation portion 6 examines another section traveling route which has not yet been examined.

When the foregoing steps S502 to S508 are repeated until termination in the section traveling route generation portion 6, the examination of all the section traveling routes represented by the section traveling route data stored in the section traveling route storage portion 7 is complete, and the section traveling route deletion processing at step S107 is terminated. Thereafter, the procedure is returned to the main routine shown in FIG. 8.

Referring now to FIG. 8 again, when the section traveling route deletion processing (at step S107) is terminated, all the route selection operations are terminated.

As described in the foregoing, according to the route selecting system and the route selecting method according to the embodiment, the section traveling route in only the section where the vehicle travels upon deviating from the optimum route, together with its attribute information, is stored. When the optimum route capable of using the section next time is searched for, the user is guided on a route obtained by replacing the section with the stored section traveling route.

Consequently, a route in which a road on which the user once traveled is reflected and is found depending on the current circumstances, thereby making it possible to guide the user.

Although in the above-mentioned embodiment, description was made of a case where the Dijkstra method is used in the optimum route searching portion 5, another route searching method may be used. Although in the above-mentioned embodiment, the section traveling route addition processing (step S106) and the section traveling route deletion processing (step S107) in the section traveling route generation portion 6 are performed after the vehicle has reached the destination point based on the traveling state processing (step S105), they may be performed simultaneously with the traveling state processing (step S105) while the vehicle is traveling toward the destination point.

When the route selecting system according to the present embodiment is shared among a plurality of drivers, the section traveling route data generated by the section traveling route generation portion 6 may be classified for each of the drivers and stored in the section traveling route storage portion 7. When any driver is guided, the crossing section examination portion 8, the guiding route generation portion 9, the map display portion 10, and the simple return route selection portion 12 may use only the section traveling route data corresponding to the driver to generate a guiding route. Consequently, it is possible to guide via the optimum route corresponding to each driver. When such processing is performed, information indicating who is driving the vehicle may be given to each of the above-mentioned constituent elements through the information input portion 4.

Furthermore, in the above-mentioned embodiment, all the section traveling routes extracted in the section traveling route generation portion 6 are described as processing objects. However, some of the roads extracted as the section traveling routes may not be liked by drivers. Examples are snowy roads and narrow mountainous roads. Therefore, it may be judged by the driver whether or not the section traveling route extracted by the section traveling route generation portion 6 is stored in the section traveling route storage portion 7. Consequently, it is possible to guide via a more optimum route in which the intention of the driver is reflected. Such judgment made by the driver may be inputted through the information input portion 4.

While the invention has been described in detail, the foregoing description is in all aspects illustrative and not restrictive. It is understood that numerous other modifications and variations can be devised without deviating from the scope of the invention.

What is claimed is:

1. A route selecting method for selecting an optimum route on a map for travel of a vehicle, said route selecting method comprising:

searching for an optimum route between two points using map data to select a route;

collecting traveling tracks on which the vehicle travels;

comparing the optimum route searched for and the traveling tracks collected, and storing only different route parts of the traveling tracks as section traveling routes;

when a user is guided, comparing the optimum route searched for and all of the section traveling routes stored to examine whether a section traveling route of the section traveling routes crossing the optimum route as a crossing section traveling route exists;

replacing, with respect to the crossing section traveling route examined, a section on the optimum route which crosses the crossing section traveling route with a corresponding part of the crossing section traveling route as a replacement, to generate a guiding route; and guiding the user using the guiding route generated.

2. The route selecting method according to claim 1, wherein said guiding operation comprises displaying, when the guiding route is displayed, the optimum route together with the guiding route, in such a manner that the guiding route and the optimum route can be distinguished from each other.

3. The route selecting method according to claim 1, wherein said storing operation comprises deleting, with respect to the section traveling route already stored as an existing section traveling route, the existing section traveling route when the vehicle newly travels on a different route in a same section as the existing section traveling route.

4. The route selecting method according to claim 2, wherein said storing operation comprises deleting, with respect to the section traveling route already stored as an existing section traveling route, the existing section traveling route when the vehicle newly travels on a different route in a same section as the existing section traveling route.

5. The route selecting method according to claim 1, wherein said storing operation comprises accumulatively storing a number of times the vehicle travels on the section traveling route together with the section traveling route, and said replacing operation comprises using, for the replacement, only the crossing section traveling route on which the vehicle travels not less than a particular number of times.

6. The route selecting method according to claim 5, wherein said storing operation comprises reducing, with respect to the section traveling route already stored as an existing section traveling route, a number of times the vehicle travels on the existing section traveling route when the vehicle newly travels on a different route in a same section as the existing section traveling route.

7. The route selecting method according to claim 1, further comprising examining whether the section traveling route including a current position of the vehicle and having a point crossing the guiding route in a travel direction is stored based on the traveling tracks collected and the guiding route generated, and generating, when the section traveling route exists, a new guiding route from the current position to a destination point using the section traveling route and the guiding route, wherein said guiding operation comprises guiding the user using the new guiding route generated when it is determined that the current position of the vehicle deviates from the guiding route.

8. The route selecting method according to claim 1, wherein said storing operation comprises storing circumstances where the vehicle travels on the section traveling route together with the section traveling route, and said replacing operation comprises using, for the replacement, only the crossing section traveling route whose circumstances stored at said storing operation conform to current circumstances.

9. The route selecting method according to claim 1, further comprising inputting a route as a traveling track on which the user desires to travel on a map, wherein said storing operation comprises finding the section traveling route using the traveling track inputted at said inputting operation in place of the traveling tracks collected at said collecting operation.

10. The route selecting method according to claim 1, wherein said storing operation comprises individually storing the section traveling route for each user, and said comparing operation and said replacing operation each comprise performing processing using only the section traveling route corresponding to the user.

11. The route selecting method according to claim 1, wherein said storing operation comprises determining the section traveling route to be stored in accordance with judgment given by the user.

12. A route selecting system for selecting an optimum route on a map for travel of a vehicle, said route selecting system comprising:

a map data storage portion being operable to store map data to select a route;

a current position and traveling track detection portion being operable to find a current position and a traveling track of the vehicle;

an information input portion being operable to input particular information in accordance with an instruction issued by a user;

an optimum route searching portion being operable to search for an optimum route between two points using the map data and the particular information;

a section traveling route generation portion being operable to compare the optimum route searched for by said optimum route searching portion and the traveling track found in said current position and traveling track detection portion, and to extract only different route parts on the traveling track as section traveling routes;

a section traveling route storage portion being operable to store the section traveling routes;

a crossing section examination portion being operable to, when the user is guided, compare the optimum route searched for by said optimum route searching portion, and all of the section traveling routes stored in said section traveling route storage portion, and to examine whether a section traveling route of the section traveling routes crossing the optimum route as a crossing section traveling route exists;

a guiding route generation portion being operable to replace, with respect to the crossing section traveling route examined by said crossing section examination portion, a section on the optimum route which crosses the crossing section traveling route with a corresponding part of the crossing section traveling route as a replacement, to generate a guiding route; and a map display output portion being operable to guide the user using the guiding route generated by said guiding route generation portion.

13. The route selecting system according to claim 12, wherein
said map display output portion displays, when the guiding route is displayed, the optimum route together with the guiding route, such that the guiding route and the optimum route can be distinguished from each other.

14. The route selecting system according to claim 12, wherein
said section traveling route generation portion deletes, with respect to the section traveling route already stored in said section traveling route storage portion to as an existing section traveling route, the existing section traveling route when the vehicle newly travels on a different route in a same section as the existing section traveling route.

15. The route selecting system according to claim 13, wherein
said section traveling route generation portion deletes, with respect to the section traveling route already stored in said section traveling route storage portion as an existing section traveling route, the existing section traveling route when the vehicle newly travels on a different route in a same section as the existing section traveling route.

16. The route selecting system according to claim 12, wherein
said section traveling route storage portion accumulatively stores a number of times the vehicle travels on the section traveling route together with the section traveling route, and
said guiding route generation portion uses, for the replacement, only the crossing section traveling route on which the vehicle travels not less than a predetermined number of times.

17. The route selecting system according to claim 16, wherein
said section traveling route generation portion reduces, with respect to the section traveling route already stored in said section traveling route storage portion as an existing section traveling route, the number of times the vehicle travels on the existing section traveling route when the vehicle newly travels on a different route in a same section as the existing section traveling route.

18. The route selecting system according to claim 12, further comprising a return route selection portion being operable to receive the current position found by said current position and traveling track detection portion and the guiding route generated by said guiding route generation portion, to examine whether the section traveling route including the current position and having a point crossing the guiding route in the travel direction exists in said section traveling route storage portion, and being operable to generate, when the section traveling route exists, a new guiding route from the current position to a destination point using the section traveling route and the guiding route,
wherein said map display output portion guides the user using the new guiding route generated by said return route selection portion when it is determined that the current position of the vehicle deviates from the guiding route.

19. The route selecting system according to claim 12, wherein
said section traveling route storage portion stores circumstances where the vehicle travels on the section traveling route together with the section traveling route, and
said guiding route generation portion uses, for the replacement, only the crossing section traveling route whose circumstances stored in said section traveling route storage portion conform to current circumstances.

20. The route selecting system according to claim 12, further comprising a traveling track input portion being operable to input a route as a traveling track on which the user desires to travel on a map,
wherein said section traveling route generation portion uses the traveling track inputted to said traveling track input portion in place of the traveling tracks found by said current position and traveling track detection portion, to extract the section traveling route.

21. The route selecting system according to claim 12, wherein
said section traveling route storage portion individually stores the section traveling route for each user, and
said crossing section examination portion and said guiding route generation portion each perform processing using only the section traveling route corresponding to the user.

22. The route selecting system according to claim 12, wherein
said section traveling route storage portion determines the section traveling route to be stored in accordance with judgment given by the user.

23. A computer program embodied on a computer readable medium for use with a computer, said computer program comprising:
computer readable program code operable to search for an optimum route between two points using map data to select a route;
computer readable program code operable to collect traveling tracks on which a vehicle travels;
computer readable program code operable to compare the optimum route searched for and the traveling tracks collected, and to store only different route parts of the traveling tracks as section traveling routes;
computer readable program code operable to, when a user is guided, compare the optimum route searched for and all of the section traveling routes stored to examine whether a section traveling route of the section traveling routes crossing the optimum route as a crossing section traveling route exists;
computer readable program code operable to replace, with respect to the crossing section traveling route examined, a section on the optimum route which crosses the crossing section traveling route with a corresponding part of the crossing section traveling route as a replacement, to generate a guiding route; and
computer readable program code operable to guide the user using the guiding route generated.

24. The computer program according to claim 23, wherein
said computer readable program code operable to guide comprises computer readable program code operable to display, when the guiding route is displayed, the optimum route together with the guiding route, in such a manner that the guiding route and the optimum route can be distinguished from each other.

25. The computer program according to claim 23, wherein
said computer readable program code operable to store comprises computer readable program code operable to delete, with respect to the section traveling route already stored as an existing section traveling route, the existing section traveling route when the vehicle newly travels on a different route in a same section as the existing section traveling route.

26. The computer program according to claim 24, wherein said computer readable program code operable to store comprises computer readable program code operable to delete, with respect to the section traveling route already stored as an existing section traveling route, the existing section traveling route when the vehicle newly travels on a different route in a same section as the existing section traveling route.

27. The computer program according to claim 23, wherein said computer readable program code operable to store comprises computer readable program code operable to accumulatively store a number of times the vehicle travels on the section traveling route together with the section traveling route, and said computer readable program code operable to generate comprises computer readable program code operable to use, for the replacement, only the crossing section traveling route on which the vehicle travels not less than a predetermined number of times.

28. The computer program according to claim 27, wherein said computer readable program code operable to store comprises computer readable program code operable to reduce, with respect to the section traveling route already stored as an existing section traveling route, a number of times the vehicle travels on the existing section traveling route when the vehicle newly travels on a different route in a same section as the existing section traveling route.

29. The computer program according to claim 23, further comprising computer readable program code operable to examine whether the section traveling route including the current position of the vehicle and having a point crossing the guiding route in a travel direction is stored based on the traveling tracks collected and the guiding route generated, and generate, when the section traveling route exists, a new guiding route from the current position to a destination point using the section traveling route and the guiding route, wherein said computer readable program code operable to guide comprises computer readable program code operable to guide the user using the new guiding route generated when it is determined that the current position of the vehicle deviates from the guiding route.

30. The computer program according to claim 23, wherein said computer readable program code operable to store comprises computer readable program code operable to store circumstances where the vehicle travels on the section traveling route together with the section traveling route, and said computer readable program code operable to replace comprises computer readable program code operable to use, for the replacement, only the crossing section traveling route whose circumstances stored in said computer readable program code operable to store conform to current circumstances.

31. The computer program according to claim 23, further comprising computer readable program code operable to input a route as a traveling track on which the user desires to travel on a map, wherein said computer readable program code operable to store comprises computer readable program code operable to find the section traveling route using the traveling track inputted at said computer readable program code operable to input in place of the traveling tracks collected at said computer readable program code operable to collect.

32. The computer program according to claim 23, wherein said computer readable program code operable to store comprises computer readable program code operable to individually store the section traveling route for each user, and said computer readable program code operable to compare and said computer readable program code operable to replace each comprise computer readable program code operable to perform processing using only the section traveling route corresponding to the user.

33. The computer program according to claim 23, wherein said computer readable program code operable to store comprises computer readable program code operable to determine the section traveling route to be stored in accordance with judgment given by the user.

* * * * *